(12) United States Patent
Kanno

(10) Patent No.: US 10,713,161 B2
(45) Date of Patent: *Jul. 14, 2020

(54) MEMORY SYSTEM AND METHOD FOR CONTROLLING NONVOLATILE MEMORY

(71) Applicant: Toshiba Memory Corporation, Minato-ku (JP)

(72) Inventor: Shinichi Kanno, Tokyo (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,724

(22) Filed: Mar. 20, 2019

(65) Prior Publication Data

US 2019/0220395 A1 Jul. 18, 2019

Related U.S. Application Data

(63) Continuation of application No. 15/059,785, filed on Mar. 3, 2016, now Pat. No. 10,282,288.

(30) Foreign Application Priority Data

Dec. 14, 2015 (JP) .................. 2015-242998

(51) Int. Cl.
*G06F 12/00* (2006.01)
*G06F 12/02* (2006.01)
*G06F 3/06* (2006.01)

(52) U.S. Cl.
CPC ............ *G06F 12/0246* (2013.01); *G06F 3/06* (2013.01); *G06F 3/061* (2013.01); *G06F 3/0652* (2013.01);

(Continued)

(58) Field of Classification Search
CPC .... G06F 12/0246; G06F 3/0652; G06F 3/061; G06F 3/0659; G06F 3/0679; G06F 3/06;
(Continued)

(56) References Cited

U.S. PATENT DOCUMENTS

2009/0172257 A1 7/2009 Prins
2010/0191897 A1 7/2010 Zhang
(Continued)

FOREIGN PATENT DOCUMENTS

JP 2014-505941 A 3/2014
JP 2014-512616 A 5/2014
WO WO 2012/020544 A1 2/2012

OTHER PUBLICATIONS

Shin-ichi Kanno, et al., "Theoretical Write Amplification Analysis of the SSD", (with English Abstract), Technical Report of IEICE, 2014, 6 pgs.

*Primary Examiner* — Kalpit Parikh
(74) *Attorney, Agent, or Firm* — Oblon, McClelland, Maier & Neustadt, L.L.P.

(57) ABSTRACT

According to one embodiment, a memory system includes a nonvolatile memory, and a controller electrically connected to the nonvolatile memory. The controller receives, from a host, a write command including a logical block address. The controller obtains a total amount of data written to the nonvolatile memory by the host during a time ranging from a last write to the logical block address to a current write to the logical block address, or time data associated with a time elapsing from the last write to the logical block address to the current write to the logical block address. The controller notifies the host of the total amount of data or the time data as a response to the received write command.

20 Claims, 24 Drawing Sheets

(52) U.S. Cl.
CPC .......... *G06F 3/0659* (2013.01); *G06F 3/0679* (2013.01); *G06F 2212/1044* (2013.01); *G06F 2212/7201* (2013.01); *G06F 2212/7205* (2013.01)

(58) Field of Classification Search
CPC ..... G06F 2212/1044; G06F 2212/7201; G06F 2212/7205
See application file for complete search history.

(56) References Cited

U.S. PATENT DOCUMENTS

| | | |
|---|---|---|
| 2011/0072233 A1 | 3/2011 | Dawkins |
| 2011/0145486 A1 | 6/2011 | Owa |
| 2012/0278533 A1 | 11/2012 | Suzuki et al. |
| 2012/0284544 A1 | 11/2012 | Xian |
| 2013/0051144 A1 | 2/2013 | Suzuki |
| 2013/0138915 A1 | 5/2013 | Sasaki |
| 2014/0281177 A1 | 9/2014 | Radke |
| 2014/0359206 A1 | 12/2014 | Sadovsky |
| 2015/0277802 A1 | 10/2015 | Oikarinen |
| 2016/0147649 A1* | 5/2016 | Magdon-Ismail ........................ G06F 12/0238 711/118 |

* cited by examiner

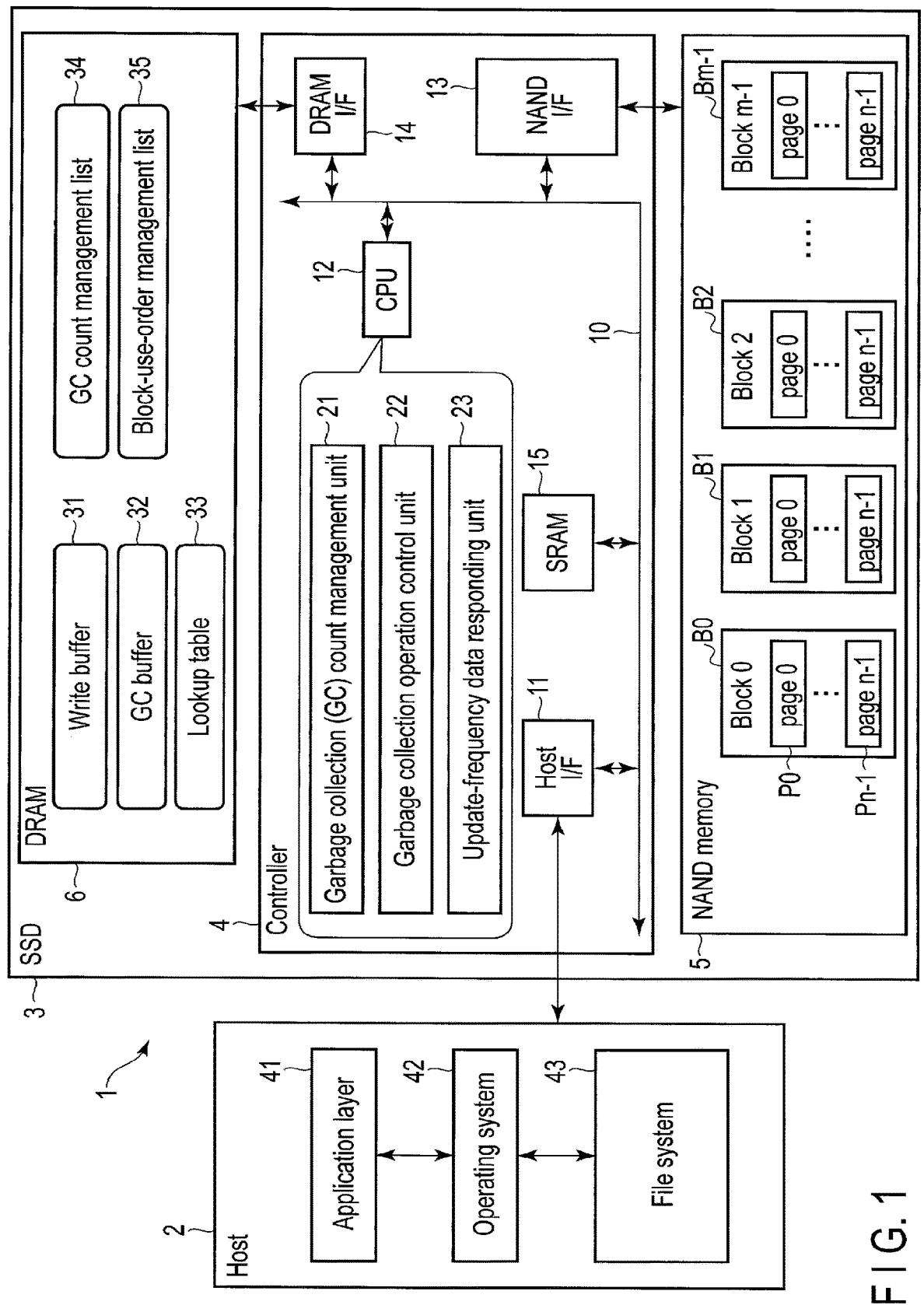
F I G. 1

| GC count = 0 | block | block | block | |
|---|---|---|---|---|
| GC count = 1 | block | block | block | |
| GC count = 2 | block | block | block | |
| GC count = 3 | block | block | block | |
| GC count = 4 | block | block | block | block |
| GC count = 5 | block | block | block | block |
| GC count = 6 | block | block | block | |
| GC count = 7 | block | block | block | block |
| GC count = 8 | block | block | block | block |
| GC count = 9 | block | block | block | block |
| GC count = 10 | block | block | block | |

34

F I G. 3

| GC count = 0 | block | block | block | |
|---|---|---|---|---|
| GC count = 1 | block | block | block | |
| GC count = 2 | block | block | block | |
| GC count = 3 | block | block | block | |
| GC count = 4 | block | block | block | block |
| GC count = 5 | block (B2) | block (B5) | block (B11) | block (B21) |
| GC count = 6 | block | block | block | |
| GC count = 7 | block | block | block | block |
| GC count = 8 | block | block | block | block |
| GC count = 9 | block | block | block | block |
| GC count = 10 | block | block | block | |

Select blocks having same GC count as GC target blocks

F I G. 4

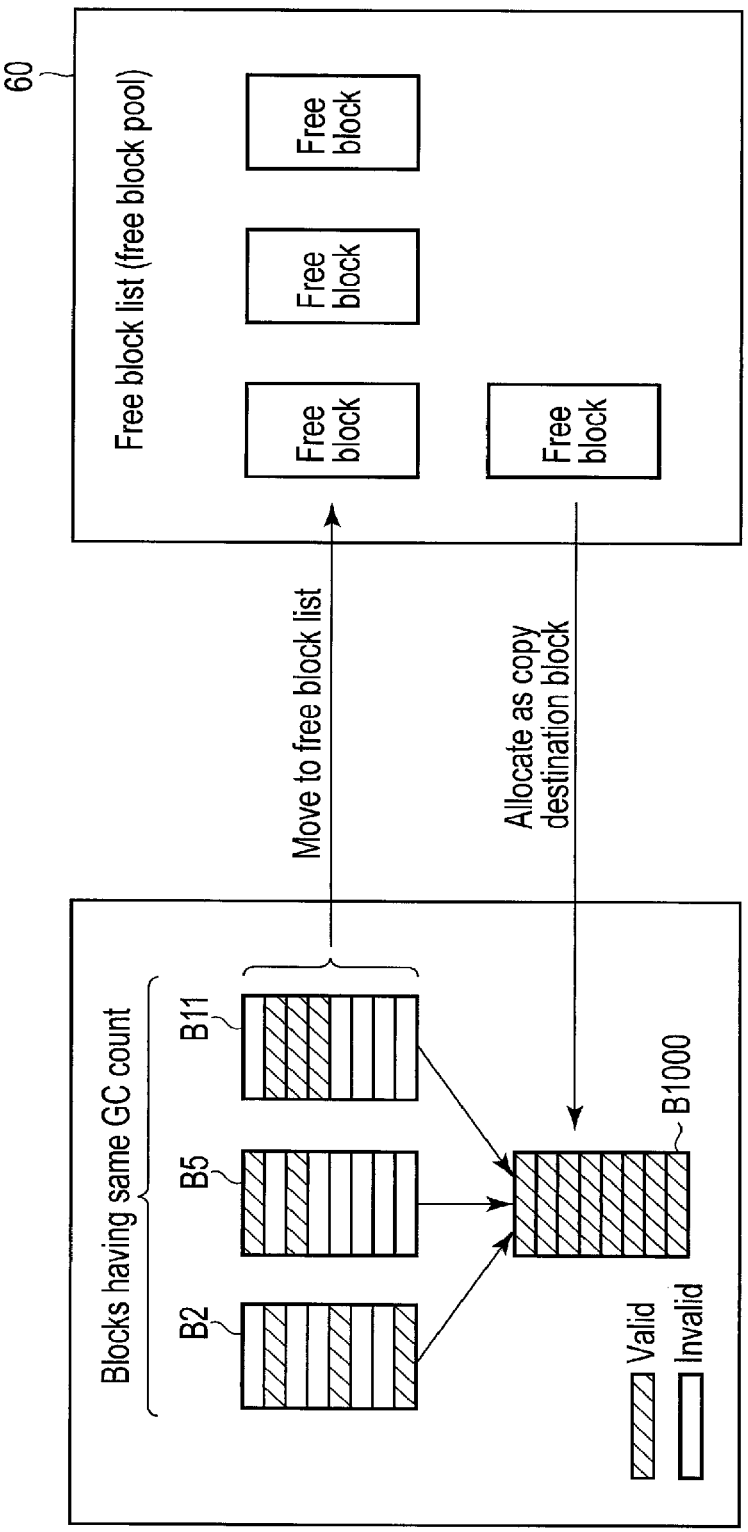
F I G. 5

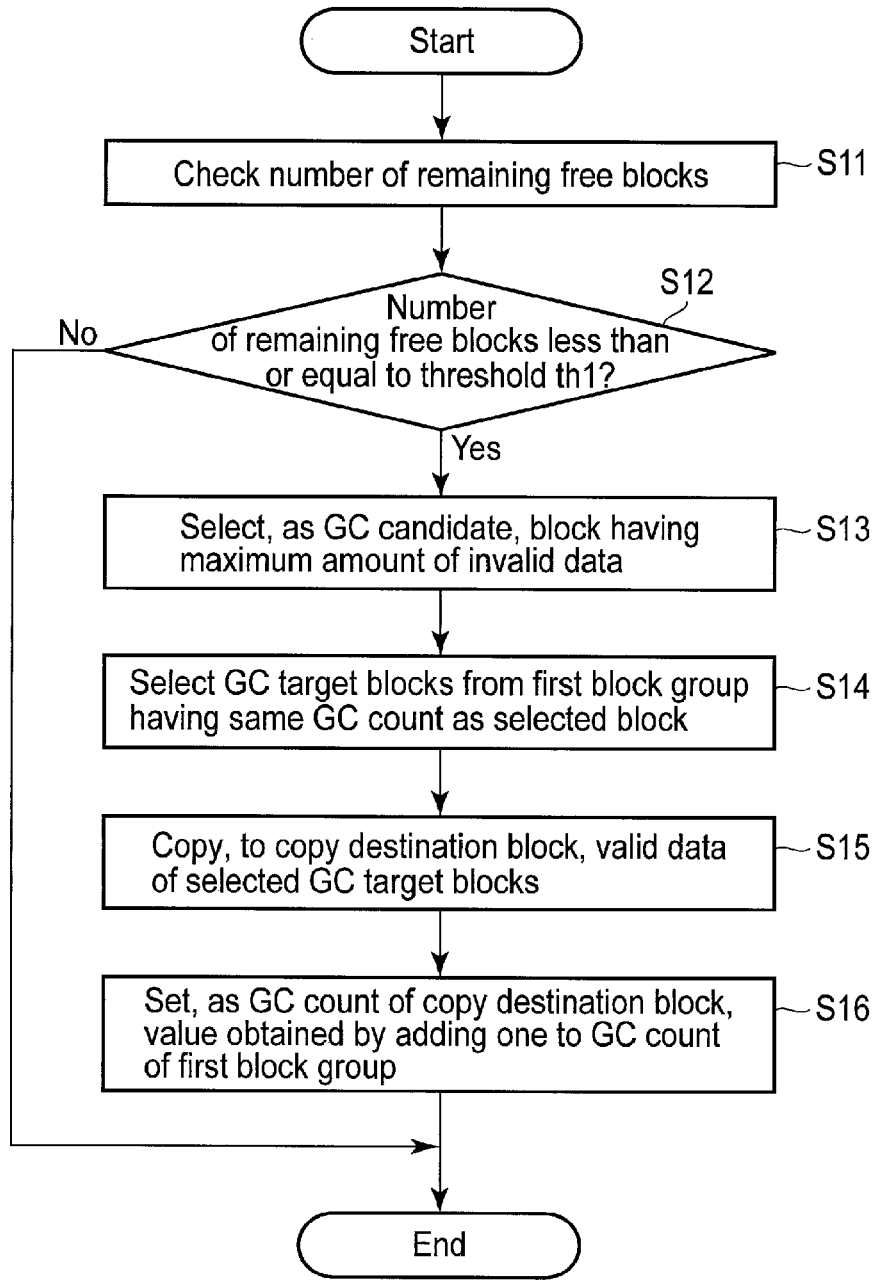
F I G. 8

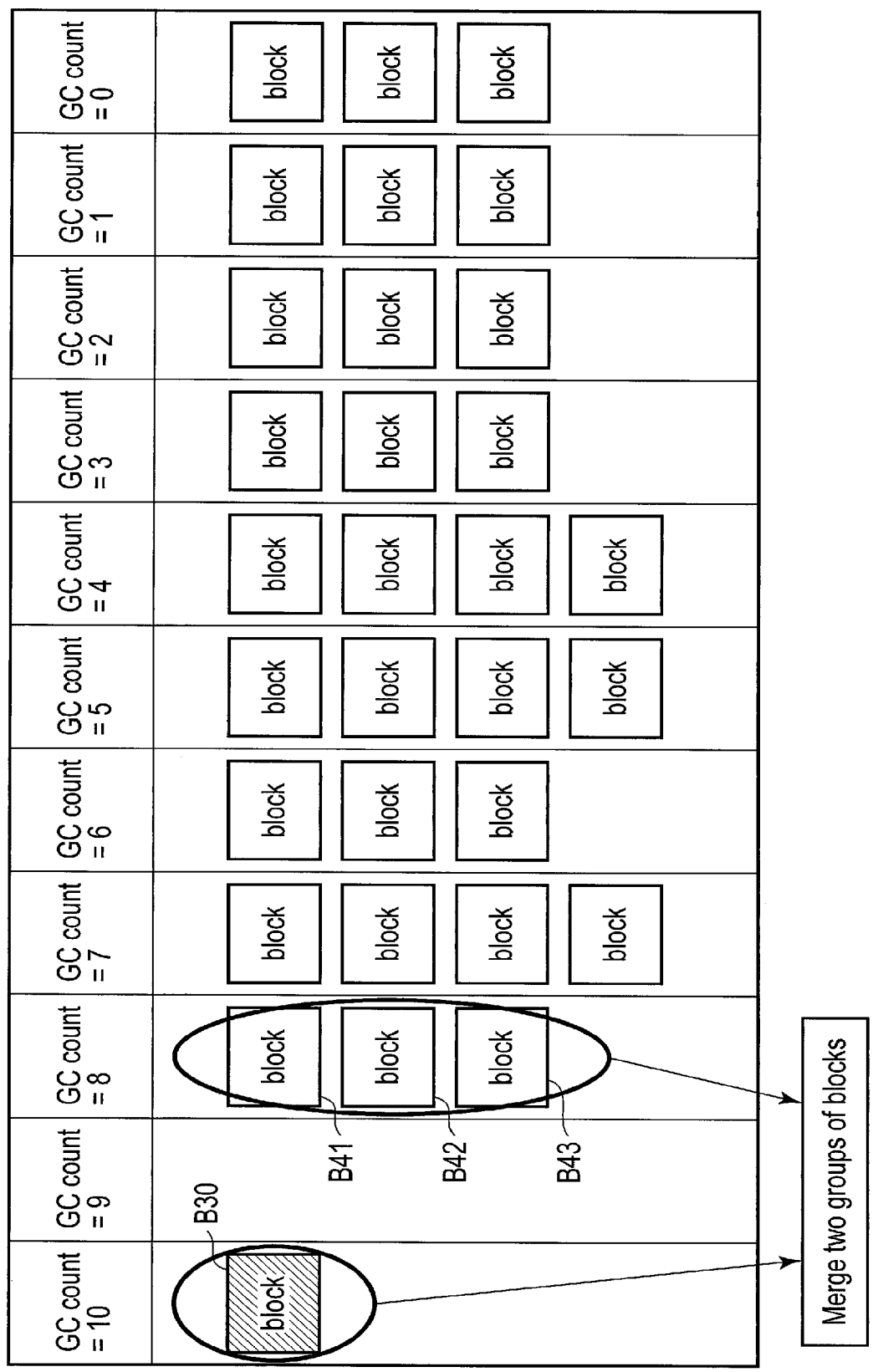
F I G. 9

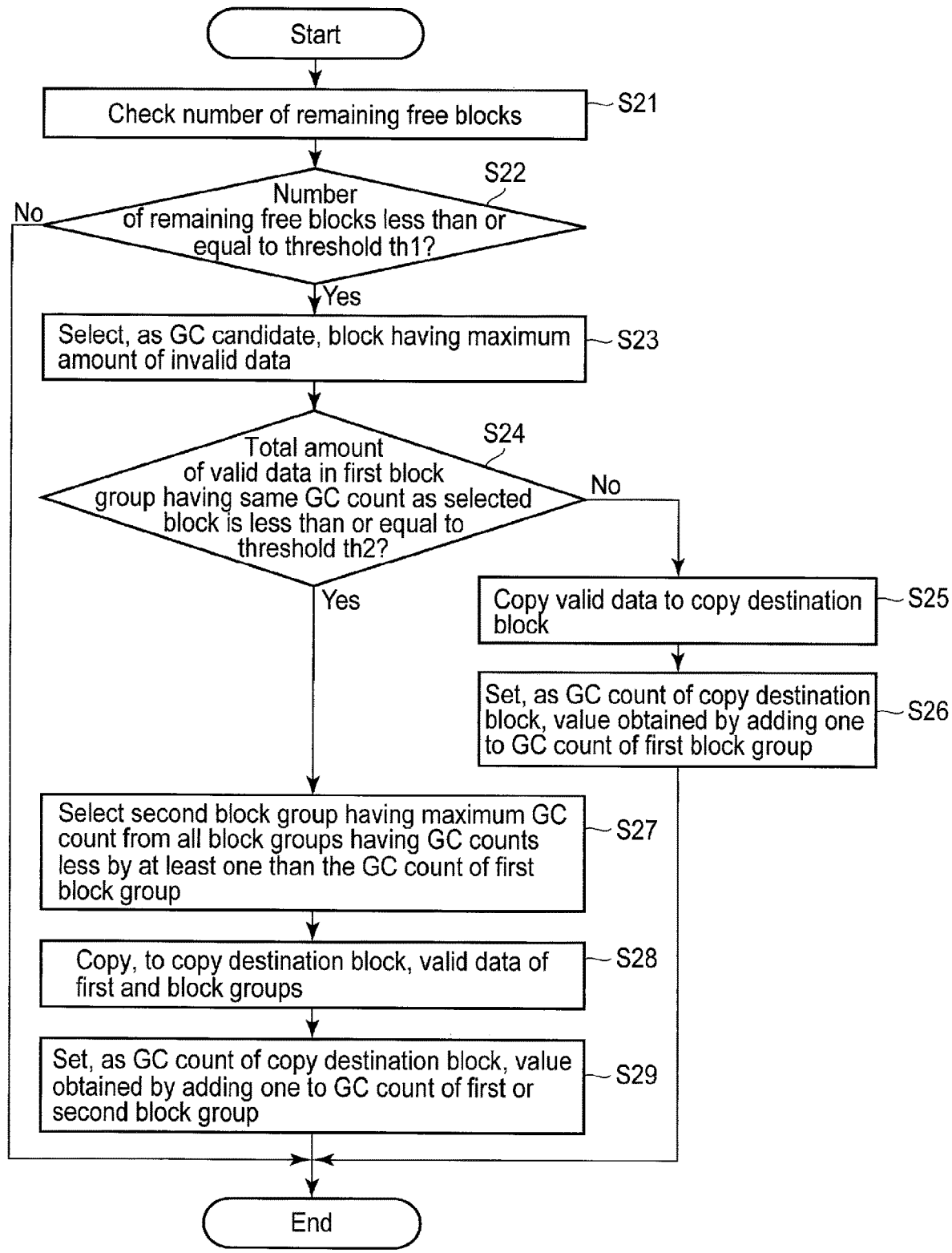
F I G. 10

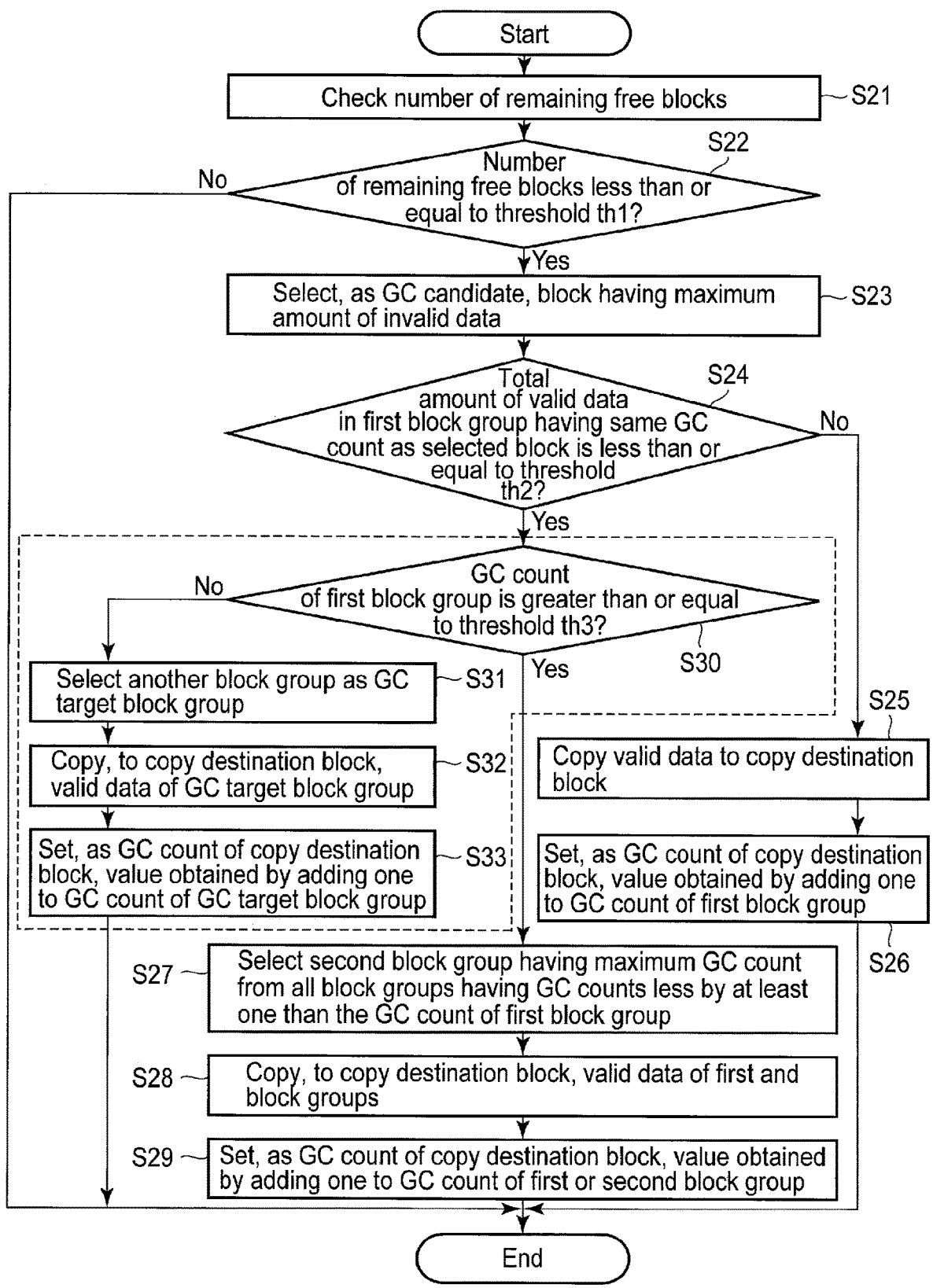
F I G. 12

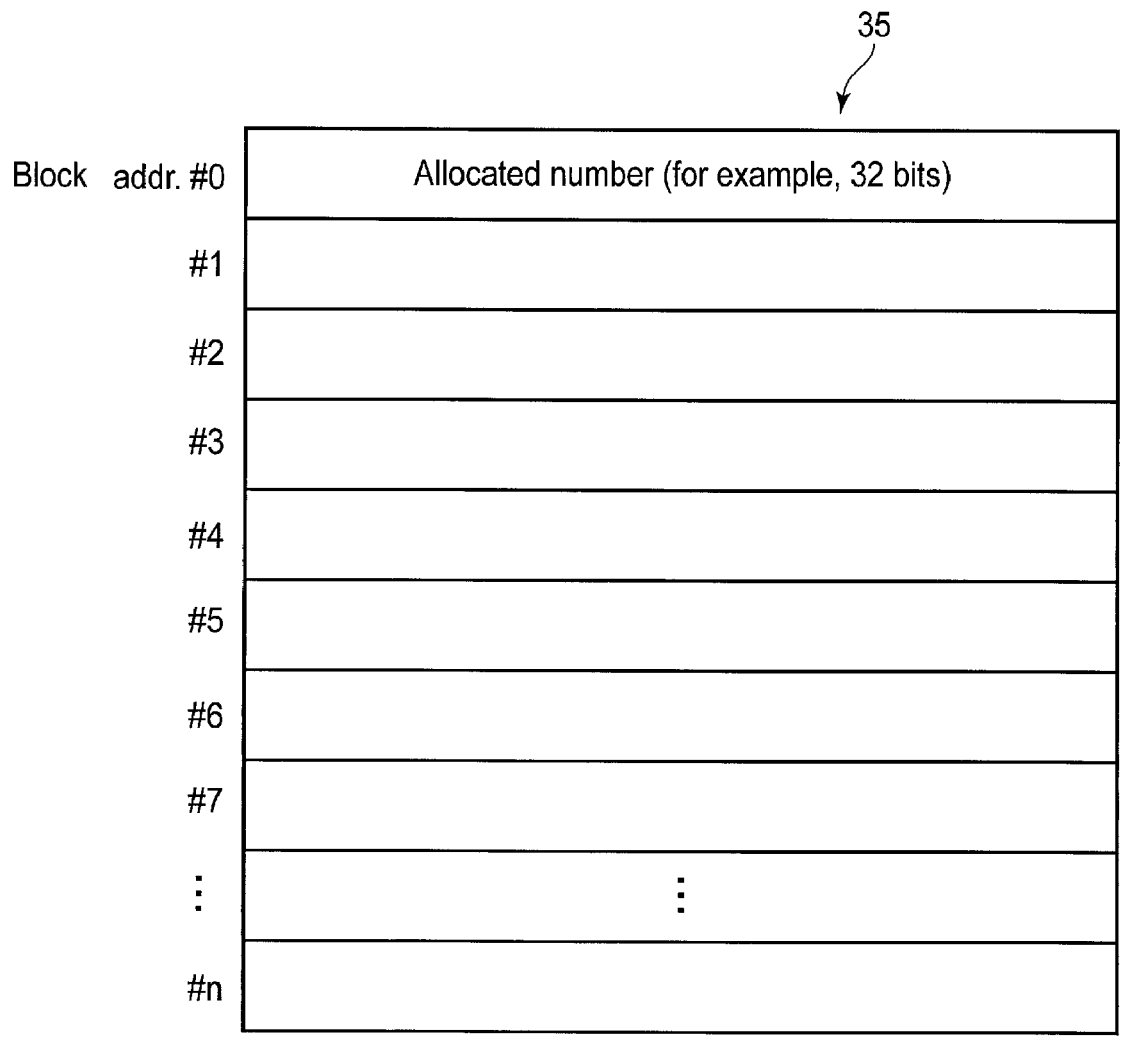
F I G. 14

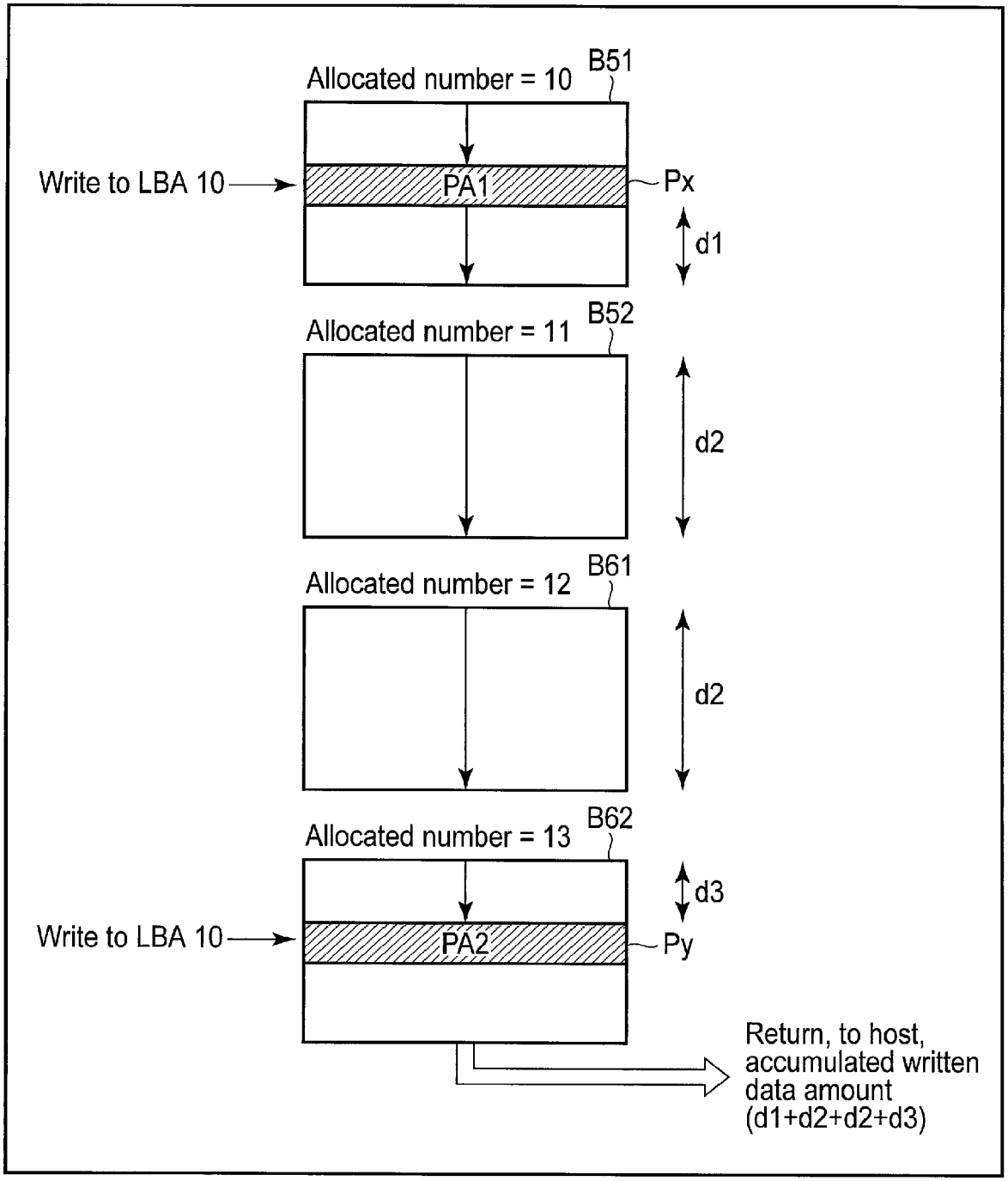
F I G. 15

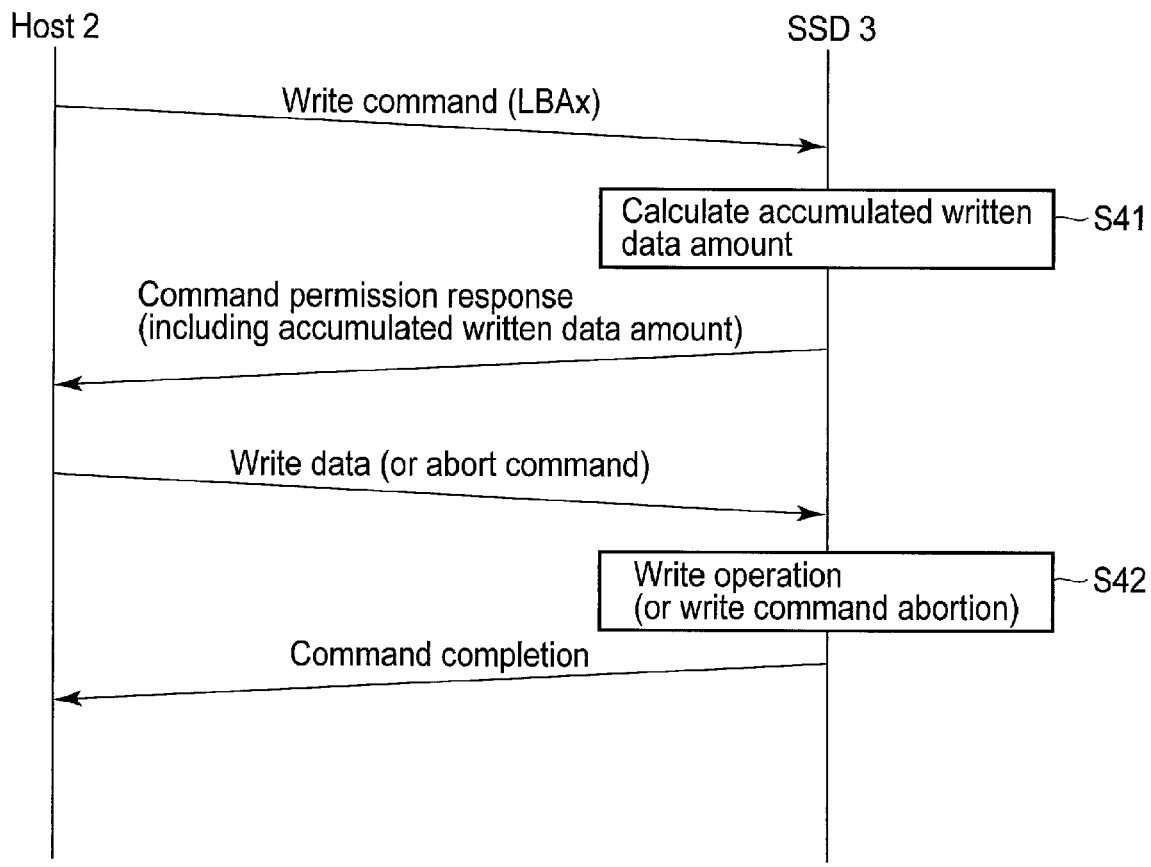
F I G. 16

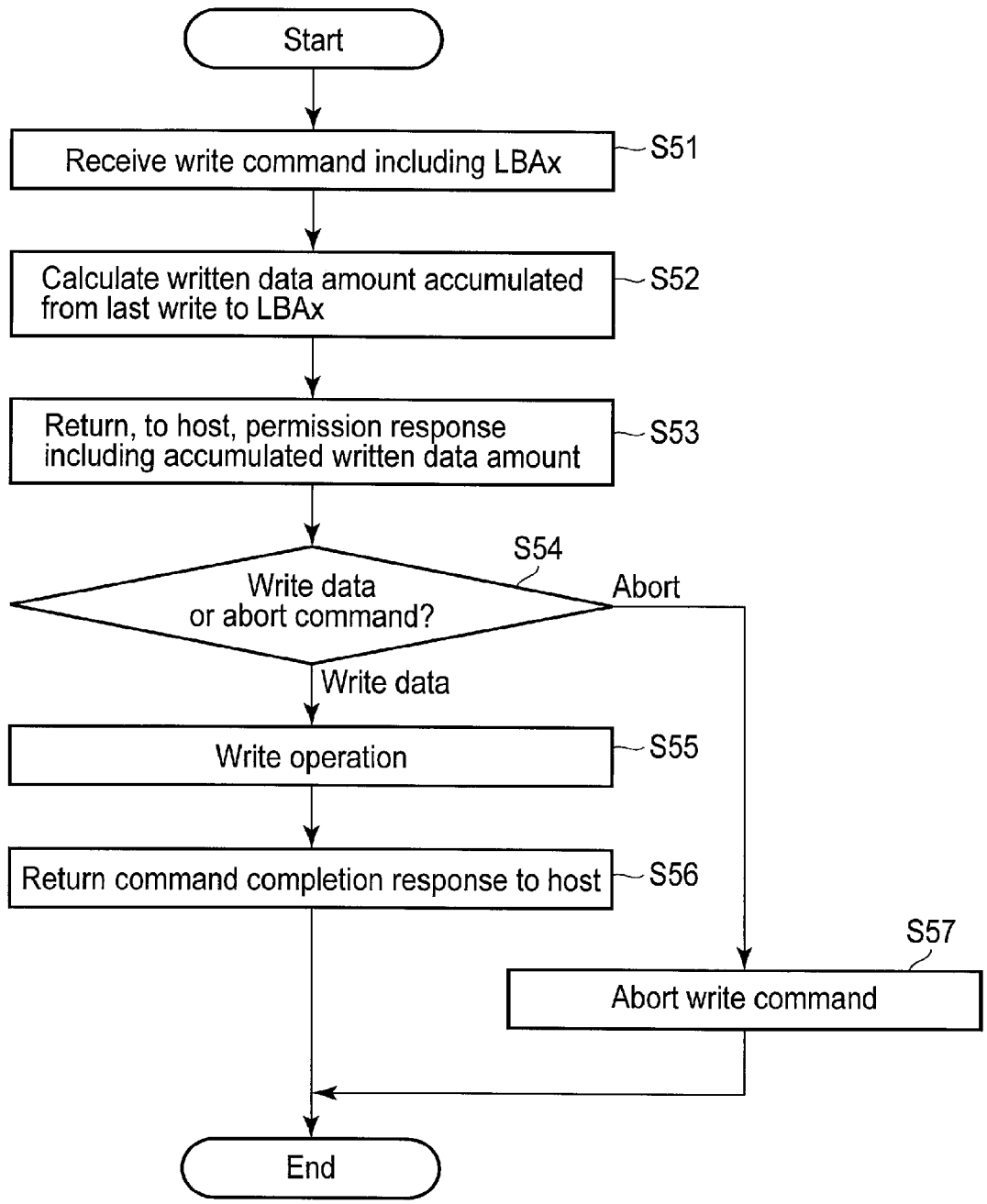
F I G. 17

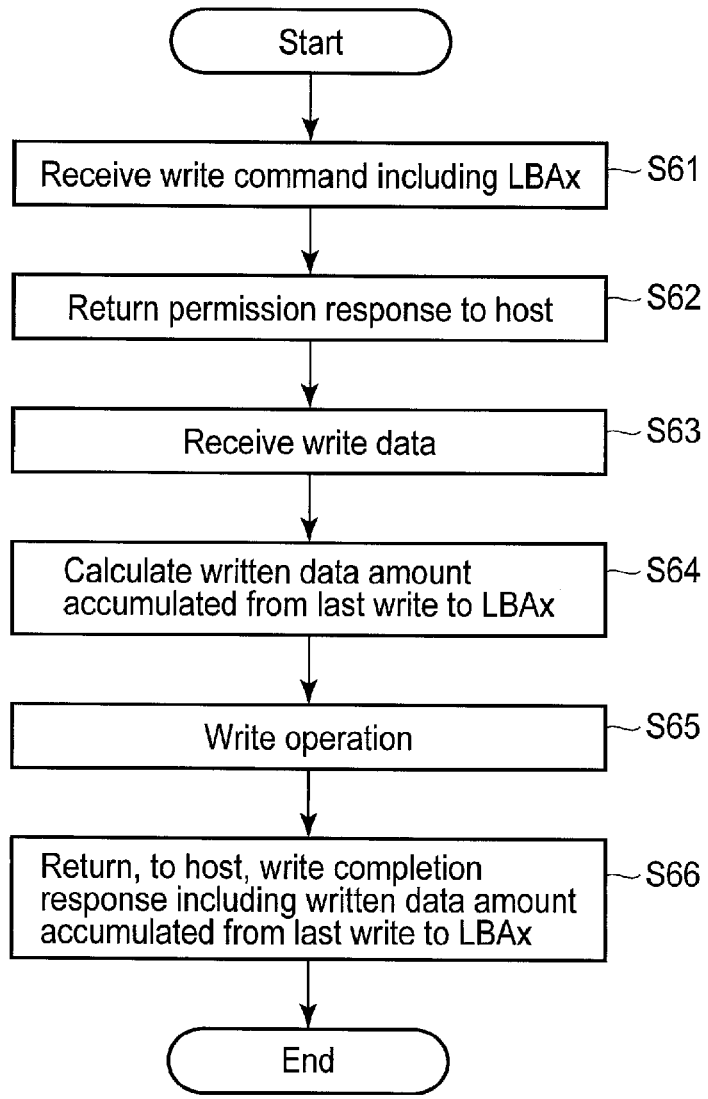
F I G. 19

| | Physical address (PA) | Time of writing |
|---|---|---|
| LBA #0 | | |
| #1 | | |
| #2 | | |
| #3 | | |
| #4 | | |
| #5 | | |
| #6 | | |
| ⋮ | ⋮ | ⋮ |
| #n | | |

F I G. 20

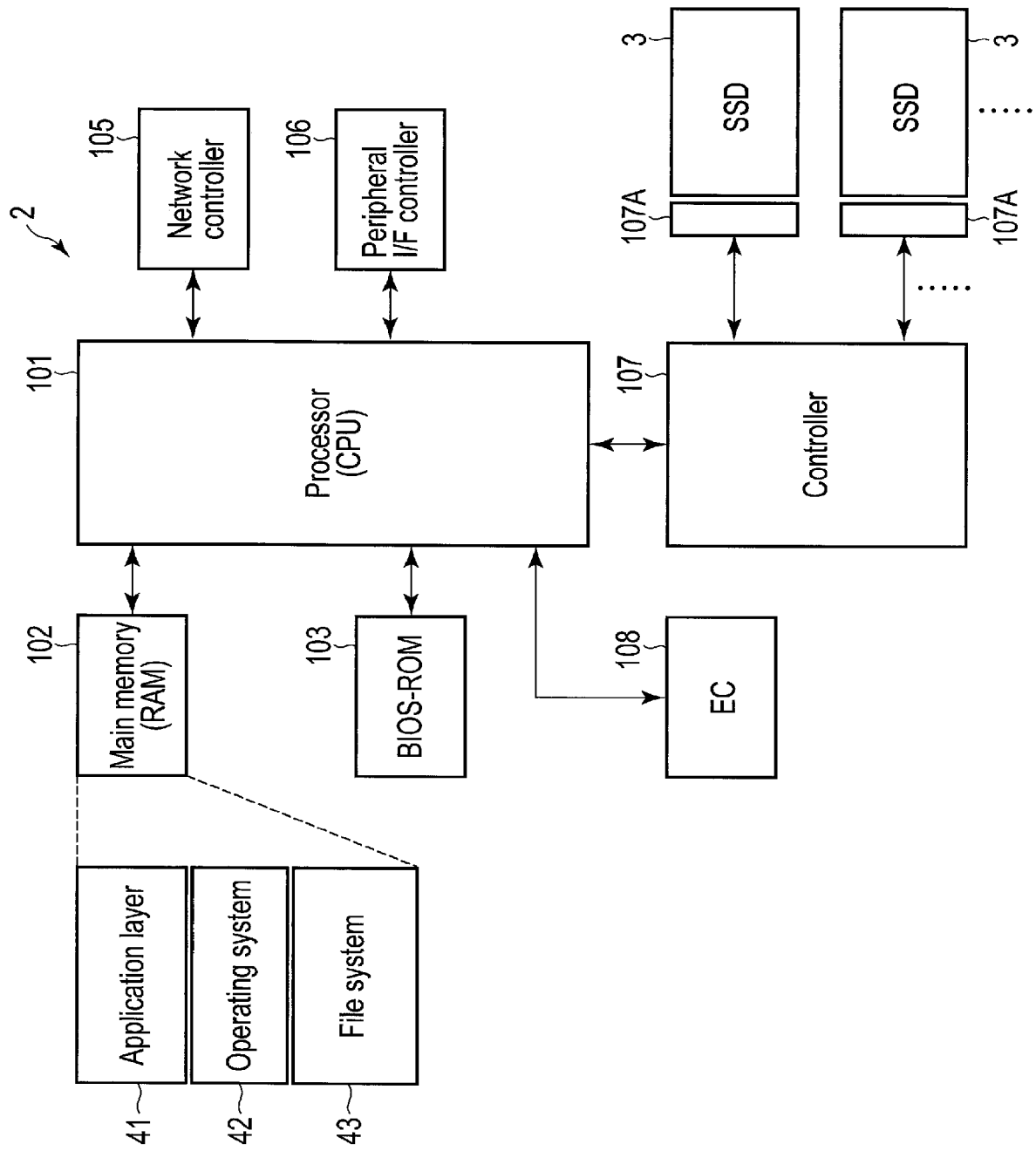
F I G. 23

MEMORY SYSTEM AND METHOD FOR CONTROLLING NONVOLATILE MEMORY

CROSS-REFERENCE TO RELATED APPLICATIONS

This application is a continuation U.S. patent application Ser. No. 15/059,785, filed Mar. 3, 2016, which is based upon and claims the benefit of priority from Japanese Patent Application No. 2015-242998, filed Dec. 14, 2015, the entire contents of which are incorporated herein by reference.

FIELD

Embodiments described herein relate generally to technology of controlling a nonvolatile memory.

BACKGROUND

Recently, memory systems comprising nonvolatile memories have become widespread.

As one of these memory systems, a NAND-flash solid-state drive (SSD) is known.

Because of their low-power-consumption and high-performance, SSDs are used as the main storage of various computers.

Various attempts to improve the performance of the SSDs have recently been made under control of a host.

However, in order to improve the performance of the SSDs, there is a demand for realizing a new function of providing the host with useful data for the performance improvement.

BRIEF DESCRIPTION OF THE DRAWINGS

FIG. 1 is a block diagram illustrating a configuration example of a memory system according to an embodiment.

FIG. 3 is an illustration of a garbage collection (GC) count management list used in the memory system of the embodiment.

FIG. 4 is an illustration for describing a garbage collection (GC) target block select operation performed by the memory system of the embodiment based on the GC count management list.

FIG. 5 is an illustration for describing a garbage collection (GC) operation performed by the memory system of the embodiment.

FIG. 8 is a flowchart for a procedure of a garbage collection (GC) operation performed by the memory system of the embodiment.

FIG. 9 is an illustration for describing a garbage collection (GC) operation performed by the memory system of the embodiment, which includes processing of merging valid data in two block groups having different GC counts.

FIG. 10 is a flowchart of a procedure of the GC operation performed by the memory system of the embodiment, which includes the processing of merging valid data in two block groups having different GC counts.

FIG. 12 is a flowchart of a procedure of the GC operation that includes an operation of permitting merge processing only for block groups having GC counts greater than or equal to a particular count.

FIG. 14 is an illustration for an example of a block-use-order management list used by the memory system of the embodiment.

FIG. 15 is an illustration for describing accumulated-written-data-amount calculation operation performed by the memory system of the embodiment when a write to the same LBA is requested.

FIG. 16 is an illustration of a sequence of accumulated-written-data-amount response processing performed by the memory system of the embodiment.

FIG. 17 is a flowchart of a procedure of the accumulated-written-data-amount response processing performed by the memory system of the embodiment.

FIG. 19 is a flowchart of another procedure of the accumulated-written-data-amount response processing performed by the memory system of the embodiment.

FIG. 20 is an illustration of an example of a lookup table used in the memory system of the embodiment.

FIG. 23 is a block diagram illustrating a configuration example of the host.

DETAILED DESCRIPTION

Figure 2:
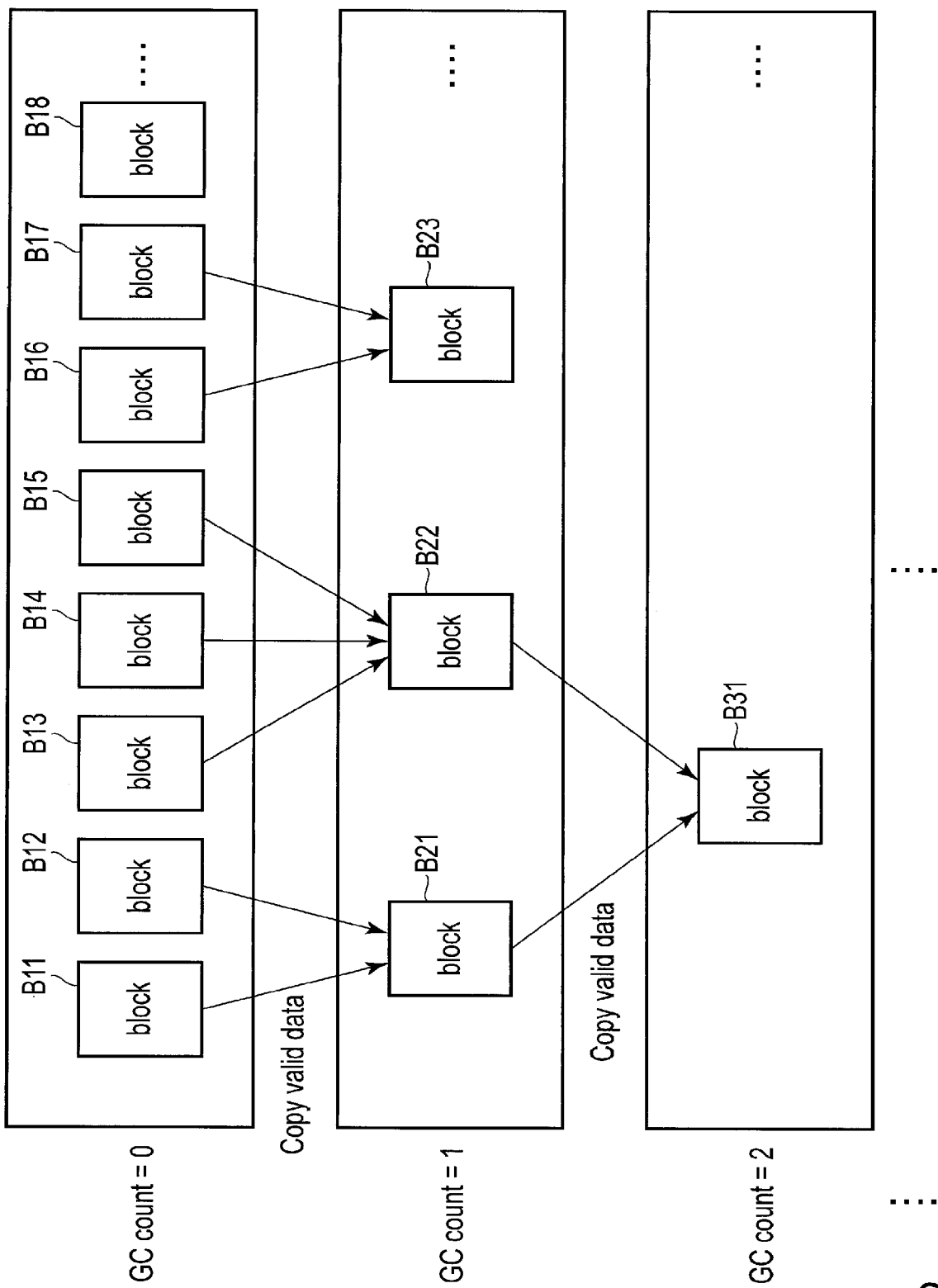
FIG. 2 is an illustration for describing a garbage collection count management operation and a garbage collection operation, which are performed by the memory system of the embodiment.

Embodiments will be described hereinafter with reference to the accompanying drawings.

In general, according to one embodiment, a memory system includes a nonvolatile memory, and a controller electrically connected to the nonvolatile memory. The controller receives, from a host, a write command including a logical block address. The controller obtains a total amount of data written to the nonvolatile memory by the host during a time ranging from a last write to the logical block address to a current write to the logical block address, or time data associated with a time elapsing from the last write to the logical block address to the current write to the logical block address. The controller notifies the host of the total amount of data or the time data as a response to the received write command.

Referring first to FIG. 1, a description will be given of an information processing system 1 that includes a memory system according to the embodiment.

This memory system is a semiconductor storage device configured to write data to a nonvolatile memory, and read data from a nonvolatile memory. The memory system is realized as, for example, a NAND-flash technology based solid-state drive (SSD) 3.

The information processing system 1 includes a host (host device) 2, and the SSD 3. The host 2 is an information processing apparatus such as a server or a personal computer.

The SSD 3 may be used as the main storage of an information processing apparatus that functions as the host 2. The SSD 3 may be accommodated in the information processing apparatus or connected thereto via a cable or a network.

As an interface for interconnecting the host 2 and the SSD 3, SCSI, Serial Attached SCSI (SAS), ATA, Serial ATA (SATA), PCI Express (PCIe), Ethernet (registered trademark), Fiber Channel, etc., may be used.

The SSD 3 comprises a controller 4, a nonvolatile memory (NAND memory) 5, and a DRAM 6. The type of the NAND memory 5 is not limited. The NAND memory 5 may include a plurality of NAND flash memory chips.

The NAND memory 5 includes a number of NAND blocks (physical blocks) B0 to Bm−1. Each of physical blocks B0 to Bm−1 serves as an erase unit. The physical block may also be referred to as a "block" or "erase block".

Physical blocks B0 to Bm−1 include many pages (physical pages). That is, each of physical blocks B0 to Bm−1 includes pages P0 to Pn−1. In the NAND memory 5, reading and writing of data are executed page by page. Erasure of data is executed block by block.

The controller 4 is electrically connected to the NAND memory 5 as a nonvolatile memory via a NAND interface 13 such as a toggle or ONFI. The controller 4 may function as a flash translation layer (FTL) configured to execute data management in the NAND memory 5 and block management in the NAND memory 5.

The data management includes, for example, (1) management of mapping data indicating the relationship between logical block addresses (LBAs) and physical addresses, and (2) processing of hiding read/write operations page by page and erase operations block by block. Mapping between the LBAs and the physical addresses is managed using a look-up table (LUT) 33. The look-up table (LUT) 33 functions a logical-to-physical address translation table. The look-up table (LUT) 33 is used to manage mapping between the LBAs and the physical addresses by a predetermined management size. Most write commands from the host 2 request writing data of 4 Kbytes. Accordingly, the look-up table (LUT) 33 may manage the mapping between the LBAs and the physical addresses in units of 4 Kbytes. A physical address corresponding to a certain LBA indicates a physical storage location within the NAND memory 5 to which the data of this LBA is written. The physical address includes a physical block address and a physical page address. Respective physical page addresses are allocated to all pages and respective physical block addresses are allocated to all physical blocks.

Writing of data to a page is enabled only once per erase cycle.

Accordingly, the controller 4 maps write (overwrite) to a certain LBA to another page in the NAND memory 5. That is, the controller 4 writes the data to this another page. Further, the controller 4 updates the look-up table (LUT) 33 and associates this LBA with this another page, and also invalidates the original page (the old data with which this LBA has been associated).

The block management includes a bad block management, wear leveling, garbage collection, etc. The wear leveling is an operation of leveling the program/erase cycles (i.e., erase counts) among the physical blocks.

The garbage collection is an operation of creating a free space in the NAND memory 5. The garbage collection operation copies, to another block (a copy-target free block), all valid data items in several target blocks in which valid data and invalid data are mixed, in order to increase the number of free blocks in the NAND memory 5. Further, the garbage collection operation updates the look-up table (LUT) 33, and maps the respective LBAs of the copied valid data to correct physical addresses. A block, which includes only the invalid data after the valid data has been copied to another block, becomes a free block. Thus, this block can be reused after erasure.

The host 2 sends a write command to the SSD 3. The write command includes the logical address (starting logical address) of write data (namely, the data to be written), and a transfer length. Although in this embodiment, the LBA is used as the logical address, an object ID may be used as the logical address in another embodiment. The LBA is represented by a serial number allocated to a logical sector (logical block). The serial number starts with zero. The size of the logical sector is, for example, 512 bytes.

The controller 4 of the SSD 3 writes, to a physical page of a physical block in the NAND memory 5, write data specified by the starting logical address (starting LBA) and the transfer length in the write command. Further, the controller 4 updates the look-up table (LUT) 33 to map the LBA corresponding to the written data to a physical address corresponding to a physical storage location at which this data is written.

More specifically, the controller 4 allocates one of the free blocks in the NAND memory 5 for writing data from the host 2. This allocated block is a write target block to which the data from the host is to be written, and will also be referred to as a "write destination block" or "input block". While updating the LUT 33, the controller 4 sequentially writes data received from the host 2 to available pages in the write target block (write destination block). If there is no more available page in the write target block, the controller 4 sets a new free block as the write target block.

Next, the configuration of the controller 4 will be described.

The controller 4 includes a host interface 11, a CPU 12, the NAND interface 13, a DRAM interface 14, an SRAM 15, etc. The CPU 12, the NAND interface 13, the DRAM interface 14 and the SRAM 15 are interconnected via a bus 10.

The host interface 11 receives, from the host 2, various commands (a write command, a read command, an UNMAP command, etc.).

The write command requests the SSD 3 to write data specified by this write command. The write command includes the LBA (starting LBA) of a first logical block to be written, and a transfer length (the number of logical blocks). The read command requests the SSD 3 to read data specified by this read command. The read command includes the LBA of a first logical block to be read, and a transfer length (the number of logical blocks).

The CPU 12 is a processor configured to control the host interface 11, the NAND interface 13, the DRAM interface 14 and the SRAM 15. The CPU 12 executes, for example, command processing for processing various commands from the host 2, in addition to the above-mentioned FTL processing.

Upon receiving, for example, a write command from the host 2, the controller 4 performs a write operation, described below, of writing, to the NAND memory 5, write data specified by the write command.

Specifically, the controller 4 writes write data to the physical storage position (available page) of a current write target block, and updates the LUT 33 to thereby map the physical address of this physical storage position to an LBA (starting LBA) included in the write command.

The FTL processing and command processing may be controlled by firmware executed by the CPU 12. The firmware causes the CPU 12 to function as a garbage collection (GC) count management unit 21, a garbage collection (GC) operation control unit 22 and an update-frequency data responding unit 23.

The data written by the host 2 to the SSD 3 may have characteristics (i.e., data locality) that part of the data is rewritten frequently, and the remaining part is not rewritten frequently. In this case, if a garbage collection (GC) operation has been repeatedly performed using a normal GC algorithm of selecting, as GC target blocks, some blocks containing larger amounts of invalid data, data of high update frequencies and data of low update frequencies may well be mixed in a single block. The mixture of data of high update frequencies and data of low update frequencies in a block may increase the write amplification of the SSD 3.

This is because, in the block in which data of a high update frequency (hot data) and data of a low update frequency (cold data) are merged, only some areas in the block are invalidated earlier by the update of the hot data, while the other areas in the block (storing the cold data) are maintained in a valid state for a long time.

If a block is filled with only the hot data, it is very likely that all data in this block will be invalidated relatively early by the update (rewrite) of the data. Accordingly, this block can be reused by simply erasing the block without executing the garbage collection.

In contrast, if the block is filled with only the cold data, all data in the block is kept in the valid state for a long time. Accordingly, it is very probable this block will not become a target of the garbage collection for a long time.

The write amplification (WA) is defined as follows:

$$WA = (\text{Total amount of data written to SSD})/(\text{Total amount of data written to SSD from host})$$

The total amount of data written to the SSD, above, corresponds to the sum of the total amount of data written to the SSD from the host and the total amount of data written to the SSD internally by, for example, the garbage collection.

An increase in the write amplification (WA) leads to an increase in the number of rewrites (the number of program/erase cycles) of each of the blocks in the SSD 3. That is, the greater the write amplification (WA) is, the faster the number of program/erase cycles of the block reaches its upper limit. This causes degradation in the endurance and life of the SSD 3.

In order to enable discrimination between data of high update frequencies and data of low update frequencies, the embodiment employs a GC function considering the GC count of data in a block, and a function of notifying an LBA-base update frequency.

The GC count management unit 21 and the GC operation control unit 22 execute the GC function considering the GC count of data in a block, and the function of notifying an LBA-base update frequency, respectively. The GC function considering the GC count of data in a block executes an improved GC operation capable of controlling an increase in the write amplification of the SSD 3 because of data locality.

The GC count management unit 21 manages the GC count of each block containing data written by the host 2. The GC count of a certain block indicates the number of times the data in the block has been copied by GC operations. That is, the GC count of the certain block indicates how many times the data of the block has been copied as valid data.

Regarding a block immediately after data has been written thereto by the host 2, namely, a block which does not contain data collected (copied) by the GC operation, its GC count is set to 0.

Some blocks wherein the GC count is 0 are selected as GC target blocks (copy source blocks). After the valid data of these blocks are copied to a copy destination free block, the GC count management unit 21 sets the GC count of this copy destination free block to 1. This is because the data of the copy destination free block is data once copied as valid data from the GC target block (copy source block).

Each block (copy source block), which includes only the invalid data as the valid data has been copied to a copy destination free block, becomes a free block. Since a free block contains no data, it is not necessary to manage the GC count of the free block.

If some blocks (copy source blocks) wherein the GC count is 1 have been selected as GC target blocks, and the valid data of these blocks have been copied to a copy destination free block, the GC count management unit 21 sets the GC count of this copy destination free block to 2. This is because the data of the copy destination free block is data already twice copied as valid data.

As described above, the GC count associated with a certain block indicates how many times the data of the block was copied by past GC operations, i.e., indicates how many GC operations were performed on the data of the block.

The GC operation control unit 22 performs an improved GC operation in which some blocks associated with the same GC count are selected as target blocks of a GC operation, and only the valid data of these blocks associated with the same GC count is copied to the same copy destination block.

For instance, the GC operation control unit 22 selects some blocks as GC target blocks from a group of blocks associated with the same GC count (namely, a set of block having the same GC count). The GC operation control unit 22 copies, to a copy destination free block, the valid data of the blocks selected as the GC target blocks. After that, the GC count management unit 21 sets the GC count of this copy destination free block to a value obtained by adding 1 to the GC count of the blocks selected as the GC target blocks.

The function of notifying an LBA-base update frequency is a function of notifying the host 2 of the frequency of writes to an LBA included in a write command, thereby efficiently assisting the host 2 to separate hot and cold data.

The function of notifying an LBA-base update frequency is executed by the update-frequency data responding unit 23.

Upon receiving a write command including an LBA from the host 2, the update-frequency data responding unit 23 notifies the host 2, in response to the write command, of a value associated with the time that has elapsed from the last write to this LBA to the current write to this LBA, or of a written data amount accumulated from the last write to the current write. The written data amount may a total amount of data written to the NAND memory 5 by the host 2 during a time ranging from a last write to this LBA to a current write to this LBA. Thus, the actual update frequency (rewrite frequency) of user data can be notified to the host 2. As a result, the host 2 can classify various types of data having different update frequencies into, for example, data (hot data) of higher update frequencies, data (cold data) of lower update frequencies, and data (warm data) of intermediate frequencies. This enables the host 2 to execute processing of, for example, distributing different types of data to different SSDs, when necessary.

Other components of the controller 4 will now be described.

The NAND interface 13 is a NAND controller configured to control the NAND memory 5 under control of the CPU 12.

The DRAM interface 14 is a DRAM controller configured to control the DRAM 6 under control of the CPU 12.

A part of the storage area of the DRAM 6 may be used as a write buffer (WB) 31 for temporarily storing data to be written to the NAND memory 5. The storage area of the DRAM 6 may also be used as a GC buffer 32 for temporarily storing data to be moved during a GC operation. The storage area of the DRAM 6 may further be used for storing the above-mentioned look-up table 33.

The storage area of the DRAM 6 may further be used as s GC count management list 34 and a block-use-order management list 35.

The GC count management list 34 is a list for holding GC counts corresponding to respective blocks which contain data written by the host 2. The GC count management list 34 may be a table showing the correspondence relationship between block IDs (for example, physical block addresses) of these blocks and the GC counts of the data of these blocks.

Alternatively, the GC count management list 34 may comprise a plurality of GC count lists for managing blocks corresponding to respective GC counts (for example, a GC count of 0 to a GC count of n). The GC count of n is the upper limit of GC counts to be managed. For example, a GC count list with the GC count of 0 holds a list of block IDs (for example, physical block addresses) of blocks associated with the GC count of 0. A GC count list with the GC count of 1 holds a list of block IDs (for example, physical block addresses) of blocks associated with the GC count of 1. The block-use-order management list 35 holds allocation numbers (sequential numbers) allocated to blocks allocated as write target blocks. That is, the controller 4 allocates, to the blocks allocated as write target blocks, numbers (allocation numbers) that indicate the order of allocation. The numbers may be sequential numbers that start with 1. For example, an allocation number of 1 is allocated to a block first allocated as a write target block, an allocation number of 2 is allocated to a block second allocated as a write target block, and an allocation number of 3 is allocated to a block third allocated as a write target block. This enables management of a block use history that shows the order in which the blocks are allocated as write target blocks. As the allocation numbers, counter values, which are incremented by one whenever a new free block is allocated as a write target block, can be used.

The SSD 3 may hold yet other types of management data. The yet other types of management data may include a page management table that holds valid/invalid flags corresponding to physical addresses. Each valid/invalid flag indicates whether a corresponding physical address (physical page) is valid. The valid physical page means that the data therein is valid. The invalid physical page means that the data therein is invalidated by its update (rewrite).

The configuration of the host 2 will be described.

The host 2 is an information processing apparatus configured to execute various computer programs. The programs executed by the information processing apparatus include an application software layer 41, an operating system 42 and a file system 43.

As is generally known, the operating system 42 is software configured to manage the entire host 2, control the hardware within the host 2, and execute control for enabling applications to use the hardware and the SSD 3.

The file system 43 is used for controlling the operation (creation, saving, update, deletion, etc.) of files. For example, ZFS, Btrfs, XFS, ext4, NTFS, etc., may be used as the file system 43. Alternatively, a file object system (for example, Ceph Object Storage Daemon), or a key value storage system (for example, Rocks DB) may be used as the file system 43.

Various application software threads run on the application software layer 41. Examples of the application software threads are client software, database software, virtual machine, etc.

When the application software layer 41 needs to send a request, such as a read command or a write command, to the SSD 3, it sends the request to the operating system 42. The operating system 42, in turn, sends that request to the file system 43. The file system 43 translates the request into a command (a read command, a write command, etc.). The file system 43 sends the command to the SSD 3. Upon receiving a response from the SSD 3, the file system 43 sends the response to the operating system 42. The operating system 42, in turn, sends the response to the application software layer 41.

Referring then to FIGS. 2 to 12, the GC function considering the GC count of data in a block will be described in detail.

FIG. 2 shows a GC count management operation and a GC operation performed by the SSD 3.

The controller 4 of the SSD 3 allocates a certain free block as a block (write target block) for writing data (write data) from the host 2, and sequentially writes write data received from the host 2 to available pages in the write target block. When all pages of the current write target block have been filled with data, the controller 4 manages the current write target block as an active block (i.e., a block containing data). Furthermore, the controller 4 allocates another free block as a new write target block. Thus, in the SSD 3, the data (write data) received from the host 2 is sequentially written to pages (from the first page toward the last page) of the current write target block in the order of arrival.

Blocks B11 to B17 in FIG. 2 are blocks obtained immediately after data has been written by the host 2, i.e., blocks wherein data therein is never been copied by the GC operation. The GC count corresponding to each of the blocks B11 to B17 is 0.

Over time, part of the data of each of the blocks B11 to B17 may be invalidated by rewriting. In this case, in each of the blocks B11 to B17, valid data and invalid data may be mixed.

When the number of free blocks becomes less than a threshold, the controller 4 starts a GC operation of making a free block from some blocks that each contain valid data and invalid data.

The controller 4 first selects some blocks wherein valid data and invalid data are mixed as GC target blocks. When selecting GC target blocks, the controller 4 selects a group of blocks associated with the same GC count, as mentioned above. The group of blocks may be a set of blocks to which, for example, a block having a maximum amount of invalid data belongs, i.e., a set of blocks that have the same GC count as the block having the maximum amount of invalid data. In this case, the controller 4 may select a block having a maximum amount of invalid data from blocks that contains the data written by the host 2. Subsequently, the controller 4 may select, as GC operation target blocks, the block having the maximum amount of invalid data, and one or more blocks associated with the same GC count as that of the first-mentioned block.

The controller 4 copies, to a copy destination free block, valid data in some selected GC target blocks (some blocks associated with the same GC count), and sets, as the GC count of the copy destination free block, a value obtained by adding 1 to the GC count of the GC target blocks. As a result, the value obtained by adding 1 to the GC count of the GC target blocks is carried on into the copy destination free block. Thus, the GC count of the copy destination free block can correctly indicate how many times the data in the copy destination free block was copied in the past by the GC operation.

For example, if two blocks B11 and B12 associated with the same GC count have been selected as GC target blocks, and valid data in the blocks B11 and B12 has been copied to a copy destination free block B21, the GC count of the copy destination free block B21 is set to a value (1 in this case) that is obtained by adding 1 to the GC count (0 in this case) of the blocks B11 and B12.

Similarly, if three blocks B13, B14 and B15 associated with the same GC count have been selected as GC target blocks, and valid data in the blocks B13, B14 and B15 has been copied to a copy destination free block B22, the GC count of the copy destination free block B22 is set to a value (1 in this case) that is obtained by adding 1 to the GC count (0 in this case) of the blocks B13, B14 and B15.

Yet similarly, if two blocks B16 and B17 associated with the same GC count have been selected as GC target blocks, and valid data in the blocks B16 and B17 has been copied to a copy destination free block B23, the GC count of the copy destination free block B23 is set to a value (1 in this case) that is obtained by adding 1 to the GC count (0 in this case) of the blocks B16 and B17.

Over time, part of the data of each of the blocks B21, B22 and B23 may be invalidated by rewriting. In this case, in each of the blocks B21, B22 and B23, valid data and invalid data may be mixed.

If two blocks B21 and B22 associated with the same GC count have been selected as GC target blocks, and valid data in the blocks B21 and B22 has been copied to a copy destination free block B31, the GC count of the copy destination free block B31 is set to a value (2 in this case) that is obtained by adding 1 to the GC count (1 in this case) of the blocks B21 and B22.

As described above, in the embodiment, the GC count managed block by block indicates how many times data in each block has been copied by past GC operations. In order to manage the GC count correctly, the value obtained by adding 1 to the GC count of the GC target blocks is carried on into the copy destination free block.

FIG. 3 shows an example of the GC count management list 34.

If a GC-count upper limit n to be managed is, for example, 10, the GC count management list 34 may comprise eleven GC count lists corresponding to GC counts of 0 to 10.

A GC count list corresponding to a GC count of 0 indicates a list of block IDs (for example, physical block addresses) allocated to blocks associated with the GC count of 0. A GC count list corresponding to a GC count of 1 indicates a list of block IDs (for example, physical block addresses) allocated to blocks associated with the GC count of 1. Similarly, a GC count list corresponding to a GC count of 10 indicates a list of block IDs (for example, physical block addresses) allocated to blocks associated with the GC count of 10. Each GC count list may be associated with only blocks in which valid and invalid data are mixed.

FIG. 4 shows a GC-target-block select operation performed by the controller 4.

In processing of selecting GC target blocks, the GC operation control unit 22 of the controller 4 may first select a group of GC target blocks from a plurality of block groups (i.e., a plurality of GC count lists) associated with different GC counts. FIG. 4 shows a case where a group of blocks (blocks B2, B5, B11 and B21) having a GC count of 5 are selected, and then some GC target blocks are selected from the group of blocks having the GC count of 5.

For instance, in the processing of selecting GC target blocks, first, a block that satisfies a predetermined condition may be selected as a first GC candidate. The block that satisfies the predetermined condition may be a block included in active blocks (i.e., blocks containing data written by the host 2) and having a largest amount of invalid data. In another embodiment, the block that satisfies the predetermined condition may be the oldest block in the active blocks. In the description below, a case where a block having a largest amount of invalid data is selected as the first GC candidate is assumed.

If the block having the largest amount of invalid data is block B5, the controller 4 determines a GC count list including block B5 (in this case, a GC count list associated with the GC count of 5), selects, as the GC target blocks, the blocks (blocks B2, B5, B11 and B21) indicated by the GC count list associated with the GC count of 5, and then selects some GC target blocks from the blocks indicated by the list. For example, one or more blocks having larger amounts of invalid data may be selected as the GC target blocks from blocks B2, B5, B11 and B21. In this case, for example, the block B5 having a largest amount of invalid data, and one or more other blocks having larger amounts of invalid data (blocks B2, B11, or B21) may be selected as the GC target blocks.

FIG. 5 shows a GC operation performed by the controller 4.

The controller 4 manages a free block pool (free block list) 60 including all free blocks. The controller 4 selects one free block from these free blocks. The controller 4 sets the selected free block as a copy destination free block B1000. The controller 4 copies all valid data from the GC target blocks having the same GC count (in this case, blocks B2, B5 and B11) to the copy destination free block B1000. After that, the controller 4 updates the look-up table 33, thereby mapping the LBAs of the valid data to respective physical addresses in the copy destination free block B1000.

The GC count of the copy destination free block B1000 is set to a value obtained by adding 1 to the GC count (=5) of blocks B2, B5 and B11. Block B1000 is added to a GC count list with a GC count of 6. Blocks B2, B5 and B11 become free blocks that do not include valid data. Blocks B2, B5 and B11 converted into free blocks are discarded from the GC count list with the GC count of 5.

Figure 6:
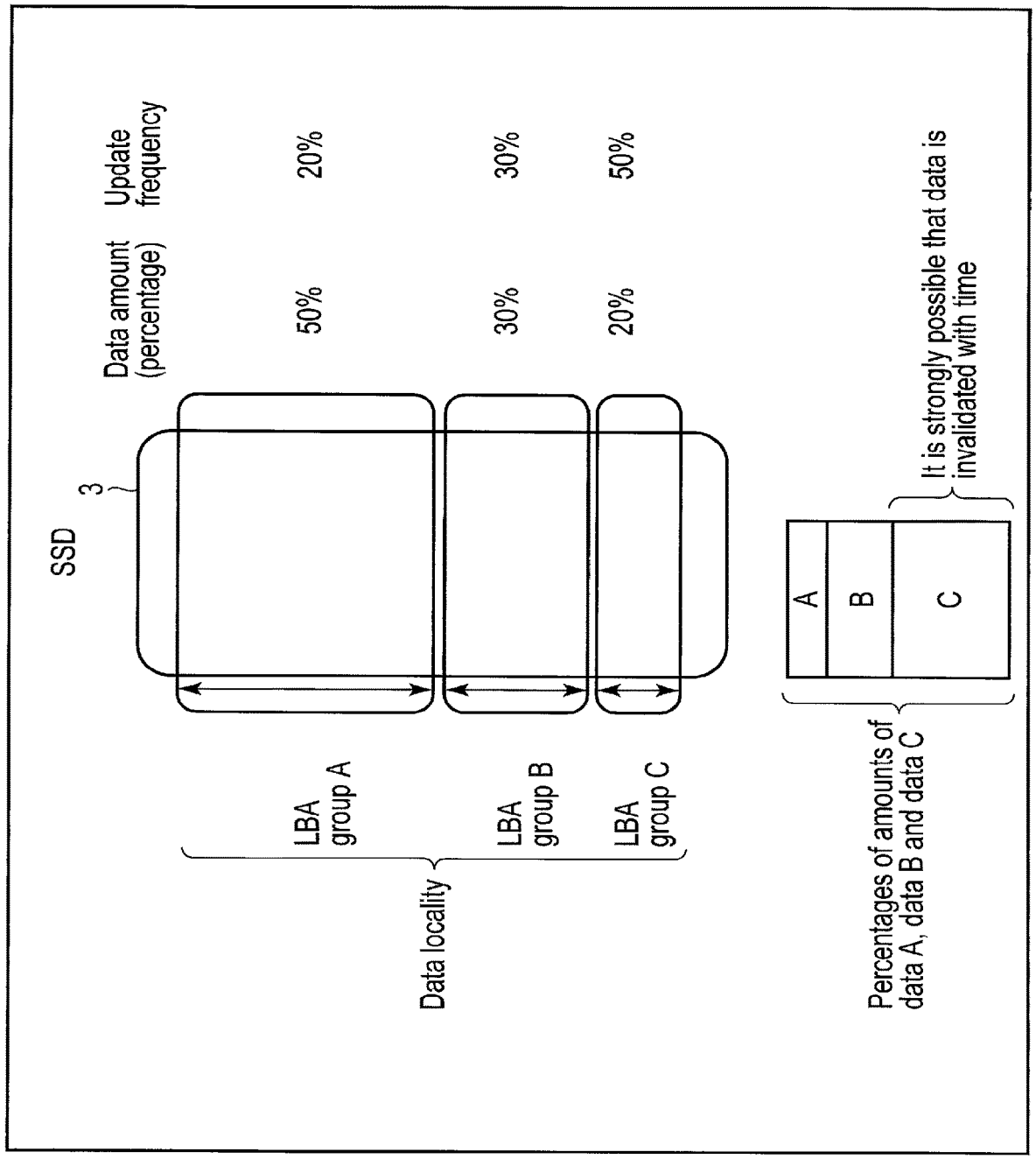
FIG. 6 is an illustration for describing examples of types of data written to the memory system of the embodiment.

FIG. 6 shows examples of two or more types of data written to the SSD 3.

In FIG. 6, a case where three types of data (data items A, B and C) having different update frequencies are written to the SSD 3 is assumed. The data storage area (LBA space) of the SSD 3 includes three spaces corresponding to LBA groups A, B and C.

Data item A written to LBA group A is of a low update frequency, and the amount of data item A is largest among data items A, B and C. That is, LBA group A has a largest LBA range.

Data item C written to LBA group C is of a high update frequency, and the amount of data item C is smallest among data items A, B and C. That is, LBA group C has a smallest LBA range.

Data item B written to LBA group B is of an update frequency intermediate between those of data items A and C, and the amount of data item B is intermediate between those of data items A and C.

The percentage of the amount of data item A to the total user capacity of the SSD 3 may be 50%, for example. The percentage of the amount of data item B to the total user capacity of the SSD 3 may be 30%, for example. The percentage of the amount of data item C to the total user capacity of the SSD 3 may be 20%, for example.

The update frequency of data item A, i.e., the frequency of writing to LBA group A, may be 20%, for example. The update frequency of the data item B, i.e., the frequency of writing to LBA group B, may be 30°, for example. The update frequency of data item C, i.e., the frequency of writing to LBA group C, may be 50%, for example.

In this case, for example, after the SSD 3 is filled with data items A, B and C, one of two write commands, issued from the host 2 to the SSD 3, requests write (update) of data item C (LBA group C), and one of five write commands, issued from the host 2 to the SSD 3, requests write (update) of data item A (LBA group A). That is, data item C is updated with a high percentage of 50%.

When the data written to the SSD 3 has data locality as shown in the upper portion of FIG. 6, data items A, B and C are merged in each write target block, as is shown in the lower portion of FIG. 6.

In one write target block, the percentage of the amount of data item C to the block capacity is 50%, the percentage of the amount of data item B to the block capacity is 30%, and the percentage of the amount of data item A to the block capacity is 20%.

Since as mentioned above, the amount of data item C is less than those of data items A and B, and the update frequency of data item C is greater than those of data items A and B, it is strongly possible that most of data C in each block will be invalidated early. In contrast, it is strongly possible that data items A and B, in particular, data item A, will be maintained in the valid state for a long time.

Blocks, where the amount of invalid data is increased by updating (rewriting) data item C, will soon become GC target blocks, and valid data is copied from these blocks to a copy destination free block. In each GC target block, it is strongly possible that a greater part of data item C is invalidated, and greater parts of data items A and B are maintained as valid data. Accordingly, in the copy destination block, the amounts of data items A and B are greater than in the GC target block, and the amount of data item C is less than in the GC target block.

In the embodiment, since the valid data of some blocks of the same GC count is copied to a copy destination free block, the valid data of a block having a small GC count is prevented from being copied by a GC operation to the same copy destination free block as the valid data of a block having a large GC count. Therefore, the greater the GC count of a block, the greater the ratio of the amount of data item A to the capacity of the block. This enables data item A (cold data) to be isolated from data item C (hot data).

Figure 7:
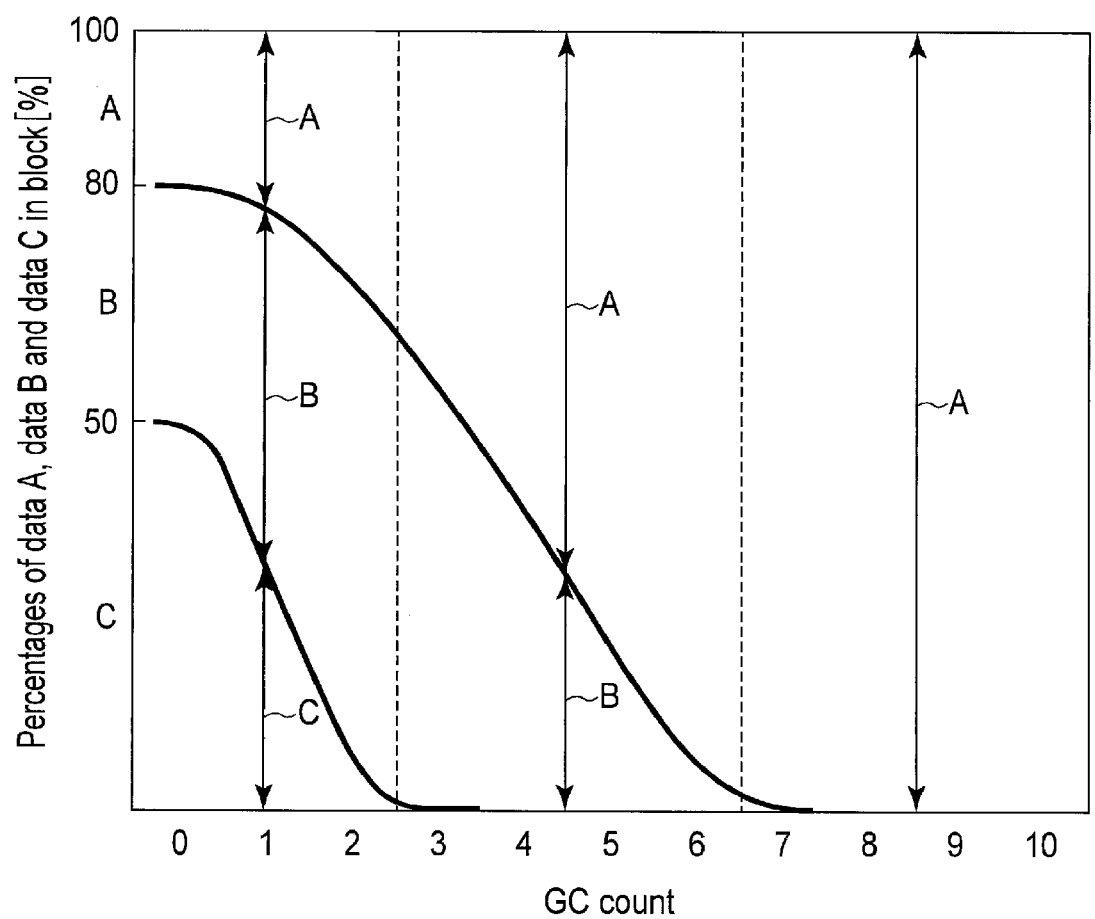
FIG. 7 is a graph illustrating a relationship example between a garbage collection (GC) count and the ratio between the amounts of various types of data.

FIG. 7 shows a relationship example between the GC count and the percentages of the amounts of data items A, B and C.

In each block with a GC count of 0, the percentage of the amount of data item C to the block capacity is 50%, the percentage of the amount of data item B to the block capacity is 30%, and the percentage of the amount of data item A to the block capacity is 20%.

The ratio of the amount of data item C to the block capacity is quickly reduced by one, two or the like GC operations. As the GC count is increased, the ratio of the amount of data item B to the block capacity is gradually reduced.

As described above, in the embodiment, the valid data of a block having a small GC count is prevented from being copied to the same copy destination free block as the valid data of a block having a large GC count. Therefore, the blocks containing data can be classified into (1) a group including substantially only data item A (in this case, the GC count is, for example, 7 to 10), (2) a group including data items A and B and almost no data item C (in this case, the GC count is, for example, 3 to 6), and (3) a group including all data items A, B and C (in this case, the GC count is, for example, 0 to 2).

In other words, in the embodiment, the percentages of the amounts of data items A, B and C can be made equal among blocks of the same GC count.

Therefore, the improved GC operation of the embodiment, in which the valid data of some blocks of the same GC count is copied to the same copy destination free block, can classify data to be written to the SSD 3 (even when the data has significant locality) into a group including substantially only data item A, a group including data items A and B and almost no data item C, and a group including all data items A, B and C, thereby gradually separating hot and cold data. As a result, increases in the write amplification of the SSD 3 can be suppressed.

The flowchart of FIG. 8 shows the procedure of a GC operation performed by the controller 4.

The controller 4 checks the number of remaining free blocks (step S11), and determines whether the number of remaining free blocks is less than or equal to threshold th1 (step S12). This check may be performed periodically. For instance, the number of remaining free blocks may be checked when a new free block is set as a write target block.

If the number of remaining free blocks is less than or equal to threshold th1 (YES in step S12), the controller 4 selects a first GC candidate from all active blocks. The first GC candidate may be a block having a maximum amount of invalid data. In this case, the block having the maximum amount of invalid data is selected as the first GC candidate from all active blocks (step S13). The controller 4 refers to the GC count management list 34, selects a group of blocks (a first group of blocks) associated with the same GC count as that of the first GC candidate (in this case, the block having the maximum invalid data amount), and further selects some GC target blocks from the first group of blocks (step S14). In step S14, a group of blocks (the first group of blocks) indicated by a GC count list that includes the first GC candidate (for example, the block having the maximum invalid data amount) is selected, and some GC target blocks are selected from the first group of blocks. In this case, the first candidate (for example, the block having the maximum invalid data amount) and one or more other blocks included in the GC count list may be selected as GC target blocks.

The controller 4 copies all valid data of the selected GC target blocks to a copy destination free block (step S15). In step S15, valid data is read from each valid page of the selected GC target blocks, and is written to each available page of the copy destination free block. In step S15, while updating the look-up table (LUT) 33 to associate the LBA of the copied valid data with the physical address of the copy destination free block, the controller 4 updates the page management table to invalidate the original pages (namely, old data associated with this LBA) of the GC target blocks. At this time, the controller 4 may first refer to the look-up table (LUT) 33 to thereby acquire the physical addresses of original pages storing the copied valid data, and then update the page management table to set, to a value indicating invalid, valid/invalid flags corresponding to the physical addresses.

After that, the controller 4 sets, as the GC count of the copy destination free block, a value obtained by adding one to the GC count of each of the selected GC target blocks, i.e., a value obtained by adding one to the GC count of the first block group (step S16).

FIG. 9 shows a GC operation including processing of merging the valid data of two block groups having different GC counts.

For example, if the amount of valid data included in a group of blocks (GC target block group) associated with the same GC count as that of a block having a maximum amount of invalid data is less than a threshold, the controller 4 performs processing of merging the valid data of two block groups having different GC counts. In this case, the controller 4 may select another block group having a GC count as close to the GC count of the GC target block group as possible.

Assume, for instance, a case where the block having the maximum amount of invalid data is block B30, and the GC count of block B30 is 10. In this case, the controller 4 checks the total amount of valid data of block groups included in a GC count management list having a GC count of 10. For example, if only block B30 is included in the GC count management list having the GC count of 10, or if two or three blocks are included in the GC count management list having the GC count of 10 but the valid data amounts of these blocks are very small, the controller 4 selects a block group to be subjected to a GC operation, along with the blocks having the GC count of 10.

At this time, the controllers 4 may select a block group having a maximum GC count among all block groups having GC counts less by at least one than the GC count of block B30 having the maximum invalid data amount (in the embodiment, a block group having a GC count of 9, a block group having a GC count of 8, a block group having a GC count of 7, . . . , a block group having a GC count of 0).

The controller 4 first refers to a GC count management list having a GC count of 9, thereby determining whether there is a block having the GC count of 9. If there is no block having the GC count of 9, the controller 4 refers to a GC count management list having a GC count of 8, thereby determining whether there is a block having the GC count of 8.

If there is no block having the GC count of 9 but there are blocks having the GC count of 8, the controller 4 selects the blocks having the GC count of 8 (for example, blocks B41, B42 and B43). Subsequently, the controller 4 copies the valid data of block B30 and the valid data of the blocks having the GC count of 8 to the copy destination free block. In this case, it is not always necessary to use all valid data of blocks B41, B42 and B43, but it is sufficient if the valid data of at least one of blocks B41, B42 and B43 is used.

The flowchart of FIG. 10 shows the procedure of a GC operation including processing of merging the valid data of two block groups having the different GC counts.

The controller 4 checks the number of remaining free blocks (step S21), thereby determining whether the number of remaining free blocks is less than or equal to threshold th1 (step S22). As described above, this check may be performed periodically.

If the number of remaining free blocks is less than or equal to threshold th1 (YES in step S22), the controller 4 selects a first GC candidate from all active blocks. The first GC candidate may be a block having a maximum amount of invalid data. In this case, the block having the maximum amount of invalid data is selected as the first GC candidate from all active blocks (step S23). The controller 4 refers to the GC count management list 34, selects a group of blocks (first block group) associated with the same GC count as that of the first GC candidate (for example, the block having the maximum amount of invalid data), thereby determining whether the total amount of the valid data of this group of blocks (first block group) is less than or equal to threshold th2 (step S24).

Threshold th2 may be a constant, or a variable that can be changed when needed. The greater threshold th2 is, the more easily the above-described merging processing is executed.

For example, threshold th2 may be beforehand set to a value that indicates the capacity of one block in the SSD 3. This enables merge processing to be permitted only when a GC operation cannot be performed using only a group of blocks having the same GC count as that of the first GC candidate. Alternatively, threshold th2 may be set to an integral multiple of the capacity of one block in the SSD 3, for example, twice the capacity.

If the total amount of the valid data of the first block group is greater than threshold th2 (NO in step S24), the controller 4 selects some GC target blocks from the first block group (step S25). In step S25, these GC target blocks are selected from the first block group indicated by a GC count list that includes the first GC candidate (for example, the block having the maximum amount of invalid data). In this case, the first GC candidate (for example, the block having the maximum amount of invalid data) and one or more other blocks included in the GC count list may be selected as GC target blocks.

In step S25, the controller 4 copies all valid data of the selected GC target blocks to a copy destination free block. The controller 4 further updates the look-up table (LUT) 33, associates the LBAs of the copied valid data with the physical addresses of the copy destination free block, and invalidates the original pages of each GC target block.

After that, the controller 4 sets, as the GC count of the copy destination free block, a value obtained by adding one to the GC count of each of the selected GC target blocks, i.e., by adding one to the GC count of the first block group (step S26).

In contrast, if the total amount of the valid data of the first block group is less than or equal to threshold th2 (YES in step S24), the controller 4 selects a group of blocks (second block group) associated with a maximum GC count, from all block groups associated with GC counts less by at least one than the GC count of the first block group (step S27).

The controller 4 copies the valid data of the first and second block groups to the copy destination free block (step S28). In step S28, the controller 4 further updates the look-up table (LUT) 33, associates the LBAs of the copied valid data with the physical addresses of the copy destination free block, and invalidates the original pages of each GC target block.

The controller 4 sets, as the GC count of the copy destination free block, a value obtained by adding one to the GC count of the second block group or by adding one to the GC count of the first block group (step S29). If the number of GC target blocks in the second block group is greater than that of GC target blocks in the first block group, the value obtained by adding one to the GC count of the second block group may be set as the GC count of the copy destination free block. Alternatively, if the number of GC target blocks in the first block group is greater than that of GC target blocks in the second block group, the value obtained by adding one to the GC count of the first block group may be set as the GC count of the copy destination free block.

Figure 11:
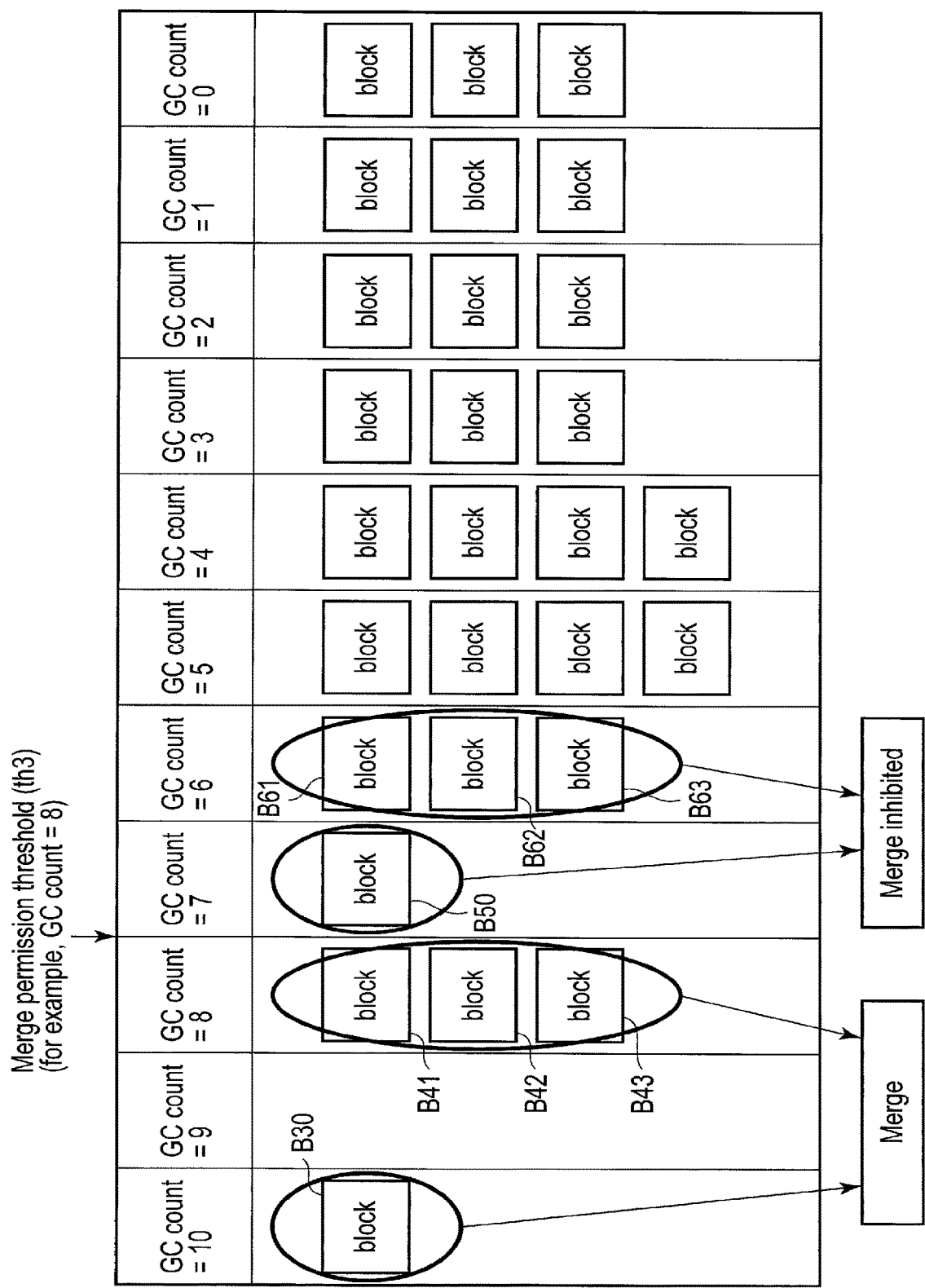
FIG. 11 is an illustration for describing an operation of permitting merge processing only for block groups having GC counts greater than or equal to a particular count.

FIG. 11 shows an operation of permitting merge processing only on a block group having a GC count greater than or equal to a predetermined value.

It is strongly possible that valid data contained in a block of a large GC count will be data (data item A) of a low update frequency. However, since data item A is also rewritten at a rate of 20%, even a block of a large GC count (for example, a block with the GC count of 10) may contain a large amount of invalid data. Valid data in a block of a large GC count is data that has never been updated (written) so far, namely, data maintained in a valid state. Therefore, it is strongly possible that this valid data will be little updated from now on.

In contrast, it is strongly possible that a block of a small GC count contains data item B or C. In such a block, all data therein may be invalidated over time even if no GC operation is executed on the block.

In view of the above, it is sufficient if merge processing is executed only on blocks having GC counts greater than or equal to merge permission threshold th3. This prevents useless data copying and hence enhances the efficiency of GC.

FIG. 11 shows an example case where merge permission threshold th3 is set to a GC count of 8.

In this case, if the GC count of a block group (first block group) associated with the same GC count as the GC count of the first GC candidate is eight or more, merge processing of the first block group and another block group will be permitted.

For example, merge processing of a block group with the GC count of 10 and another block group, and merge processing of a block group with the GC count of 9 and another block group, are permitted. However, merge processing of, for example, a block group with the GC count of 7 and another block group is inhibited.

The flowchart of FIG. 12 shows the procedure of a GC operation that includes an operation of permitting merge processing only on a block group having a GC count greater than or equal to a predetermined value.

The GC operation illustrated in the flowchart of FIG. 12 includes steps S30 to S33, in addition to the steps illustrated in FIG. 10. In the description below, steps S30 to S33 will be mainly described.

If the total amount of the valid data of the first block group is less than or equal to threshold th2 (YES in step S24), processing of the controller 4 proceeds to step S30. In step S30, the controller 4 determines whether the GC count of the first block group is greater than or equal to merge permission threshold th3.

If the GC count of the first block group is greater than or equal to merge permission threshold th3 (YES in step S30), the controller 4 performs merge processing of steps S27 to S29 described above referring to FIG. 10.

If the GC count of the first block group is less than merge permission threshold th3 (NO in step S30), the controller 4 inhibits merge processing and executes steps S31 to S33, instead.

In step S31, the controller 4 selects, as the GC target block group, another block group which differs from the first block group. For instance, the controller 4 may select, as a new GC candidate, a block that is large in the amount of invalid data next to the first GC candidate block, and may select, as the GC target block group, blocks indicated by a GC count list that includes the new GC candidate.

Subsequently, the controller 4 copies the valid data of the selected GC target block group to the copy destination free block (step S32), and sets the GC count of the copy destination free block to a value obtained by adding one to the GC count of the GC target block group (step S33).

If the first GC candidate block is associated with the GC count less than merge permission threshold th3, it is strongly possible that the first GC candidate block includes data to be frequently updated. Because of this, the controller 4 may wait, without performing GC on the first GC candidate block, until all valid data of the block is invalidated.

Referring then to FIGS. 13 to 22, the function of notifying an LBA-base update frequency will be described in detail.

Figure 13:
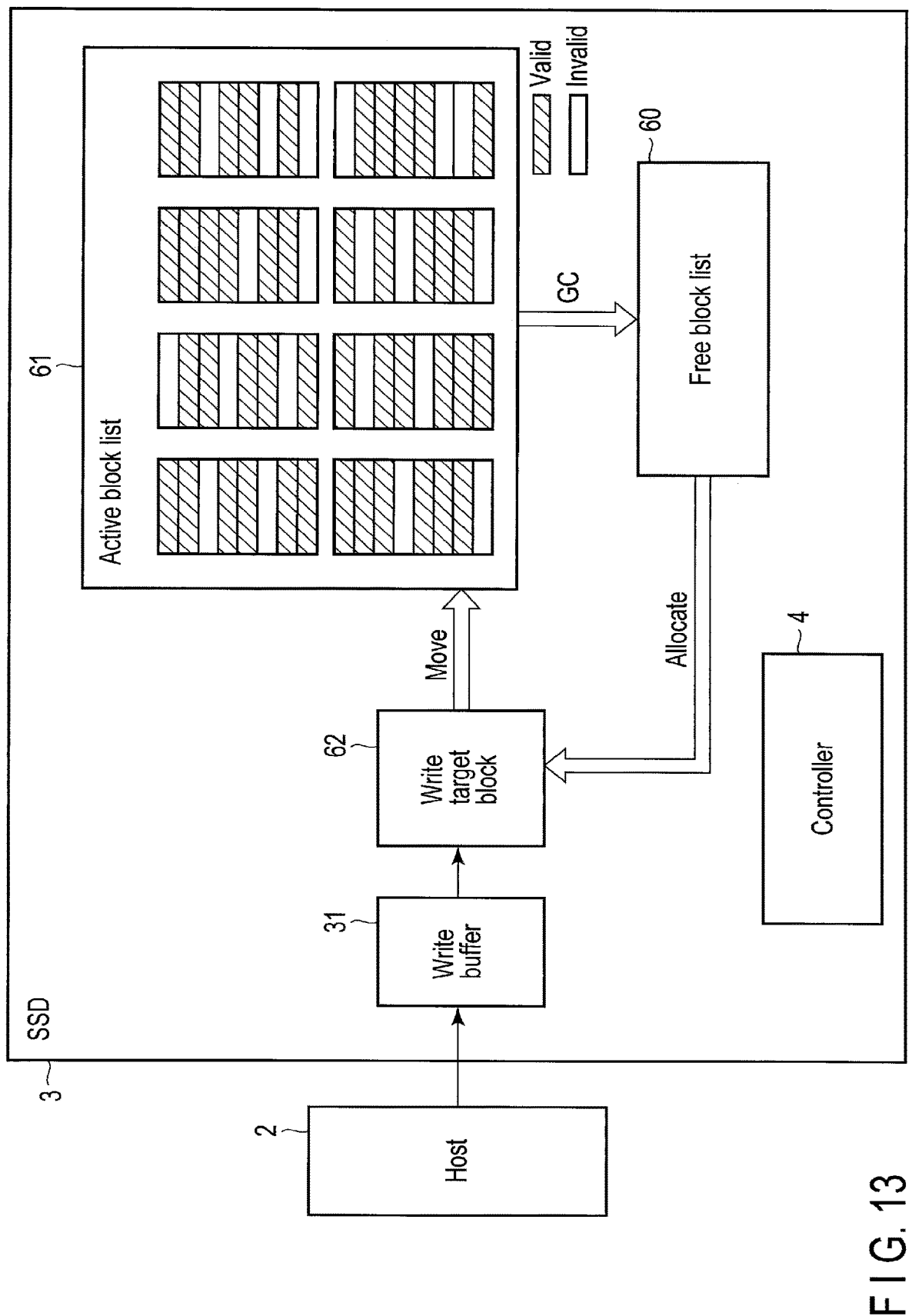
FIG. 13 is an illustration for describing an operation, performed by the memory system of the embodiment, of sequentially allocating free blocks for writing data received from a host.

FIG. 13 shows an operation of sequentially allocating free blocks as write target blocks used for writing data received from the host 2.

The controller 4 allocates, as a write target block 62, one of the free blocks indicated by the free block list 60. At this time, the controller 4 updates the block-use-order management list 35 to thereby set, to one, the allocated number (sequential number) of a block first allocated as the write target block 62. As shown in FIG. 14, the block-use-order management list 35 holds allocated numbers (sequential numbers) corresponding to respective block addresses. These allocated numbers represent the order relationship between blocks allocated to the write target block 62. That is, the controller 4 allocates numbers, indicating the order of allocation, to the blocks allocated as write target blocks, and manages these allocated numbers, using the block-use-order management list 35.

The controller 4 writes, to the write buffer 31, write data received from the host 2. After that, while updating the look-up table (LUT) 33, the controller 4 sequentially writes write data from the leading page of the write target block 62 toward the last page of the same.

If the write target block 62 has no more available pages, the controller 4 moves the write target block 62 to an active block list 61, and sets, as a new write target block 62, a free block in the free block list 60. At this time, the controller 4 updates the block-use-order management list 35 to thereby set, to two, the number (sequential number) allocated to the block that is allocated as the new write target block 62.

If all data of a block in the active block list 61 is invalidated by its update, this block is moved to the free block list 60.

If the number of free blocks in the free block list 60 decreases less than or equal to threshold th1, the above-described GC operation of creating a free block is performed.

FIG. 15 shows accumulated-written-data-amount calculation operation executed when a write to the same LBA has been requested.

Upon receiving a write command including a certain LBA from the host 2, the controller 4 notifies, in response to the write command, the host 2 of accumulated written data amount (i.e., an amount of written data accumulated from last write to this LBA). The accumulated written data amount indicates the total amount of data written by the host 2 to the NAND memory 5 during a time ranging from the last write to the same LBA as the LBA included in the received write command, to the current write to the same LBA.

The accumulated written data amount can be calculated from, for example, the following values:

(1) Capacity per block
(2) The number of pages in each block
(3) A first physical storage position (old physical address) in the NAND memory 5, to which data was written in the last write to the same LBA
(4) A second physical storage position (new physical address) in the NAND memory 5, to which data is to be written in the current write to the same LBA
(5) The number of blocks allocated for writing data from the host 2 during the time ranging from allocation of a block including the first physical storage position (old physical address) to allocation of a block including the second physical storage position (new physical address)

The values in items (1) to (4) are common management data in the SSD 3, and are not dedicated to the calculation of the accumulated written data amount. For example, the controller 4 can easily acquire, as the first physical address, a physical address mapped to an LBA included in the received write command, by referring to the look-up table (LUT) 33.

The number of blocks in item (5) can be easily calculated from, for example, a sequential number allocated to a block including the first physical position, and a sequential number allocated to a block including the second physical position.

The allocated numbers (sequential numbers) are managed using the block-use-order management list 35 of FIG. 14. Since a unit of management for the allocated numbers (sequential numbers) is a block, only a small capacity is required to hold the sequential numbers. Therefore, the accumulated written data amount can be calculated at low cost, without dedicated management data for the calculation.

FIG. 15 shows an operation of calculating the accumulated written data amount, executed upon receiving a write command including LBA 10.

Assume here a case where data is already written to page Px of block B51 by the last write to LBA 10, and data should be written to page Py of current write target block B62 by the current write to LBA 10. If the allocated number of block B51 is 10 and the allocated number of block B62 is 13, it is evident that two write target blocks (for example, blocks B52 and B61) are allocated between blocks B51 and B62.

The accumulated written data amount is given by d1+d2+d2+d3.

In this case, d1 is the number of pages included in block B51 and subsequent to page Px, or is a capacity corresponding to the number of the pages, d2 is the number of pages in one block, or the capacity of one block, and d3 is the number of pages in block B62 followed by page Py, or a capacity corresponding to the number of these pages.

The greater the number of write commands received from the host 2 during the time from the reception of the last write command including LBA 10 to the reception of the current write command including LBA 10, the greater the accumulated written data amount. Accordingly, the above-mentioned accumulated written data amount expresses the update frequency of data specified by LBA 10, i.e., the frequency of writing to LBA 10.

Upon receiving a write command, the controller 4 may obtain (calculate) the accumulated written data amount in the following procedure:

First, the controller 4 refers to the look-up table (LUT) 33, thereby acquiring an old physical address (in this case, PA1) mapped to the LBA (in this case, LBA 10) included in the write command. Subsequently, the controller 4 refers to the block-use-order management list 35, thereby acquiring an allocated block number (in this case, 10) designated by the old physical address, and an allocated block number (in this case, 13) designated by a new physical address (in this case, PA2). The controller 4 calculates d1 from the number of pages included in one block and the old physical address (PA1), and calculates d3 from the number of pages included in one block and new physical address (PA2). Furthermore, based on the difference between the allocated numbers (13) and (10), the controller calculates the total number (in this case, 2) of blocks allocated as write target blocks during the time from when the block designated by the old physical address is allocated as the write target block, to when the block designated by the new physical address is allocated as the write target block. Thus, the accumulated written data amount (=d1+d2+d2+d3) can be obtained (calculated).

FIG. 16 shows a sequence of accumulated-written-data-amount response processing.

Assume here a case where this processing sequence is applied to a Native Command Queuing (NCQ) system wherein a write command and write data are divided.

The host 2 sends, to the SSD 3, a write command including a starting LBA that indicates a certain LBA (=LBAx). In response to the received write command, the controller 4 of the SSD 3 calculates an accumulated written data amount, i.e., a written data amount accumulated during the time from the last write to LBAx to the current write to LBAx (step S41), and transmits, to the host 2, a command permission response including data on the calculated accumulated written data amount. The command permission response is a permission response indicating acknowledgement (permission of execution of the write command) to the received write command. When the SSD 3 has transmitted the permission response to the host 2, transfer of write data designated by the write command is started. The permission response may include a value that identifies a write command whose execution is permitted. The accumulated written data amount may be expressed, for example, in bytes or by the number of logical blocks (logical sectors).

In response to the command permission response, the host 2 sends write data to the SSD 3. The controller 4 of the SSD 3 writes the write data to the write buffer 31, writes the write data of the write buffer 31 to a current write target block (step S42), and transmits, to the host 2, a response indicating the completion of the command. When the write data has been written to the write buffer 31, the response indicating the completion of the command may be transmitted to the host 2.

The host 2 can grasp an actual update frequency (the frequency of writing to LBAx) of data corresponding to LBAx, based on data indicating the accumulated written data amount and included in the command permission response received from the SSD 3.

If the actual update frequency of data corresponding to LBAx differs from the update frequency of the data predicted by the host 2, for example, if the actual update frequency of the data is greater than the predicted update frequency, the host 2 may send an abort command for aborting the sent write command, when necessary. In this case, writing of the data designated by the write command is not executed.

The flowchart of FIG. 17 shows the procedure of accumulated-written-data-amount response processing executed by the controller 4.

The controller 4 receives, from the host 2, a write command including LBAx as a starting LBA (step S51). The controller 4 calculates an accumulated written data amount obtained during the time from the last write to LBAx to the current write to LBAx, based on an old physical address mapped to LBAx, a new physical address to be mapped to LBAx, an allocated number allocated to a block including a physical storage position designated by the old physical address, an allocated number allocated to a block (current write target block) including a physical storage position designated by the new physical address, etc (step S52). The controller 4 returns, to the host 2, a permission response including the accumulated written data amount (step S53).

The controller 4 determines whether write data corresponding to the write command or an abort command for aborting the write command has been received from the host 2 (step S54).

If the write data has been received, the controller 4 proceeds to step S55. In step S55, the controller 4 writes the write data to the write buffer 31, writes the write data in the write buffer 31 to the current write target block, updates the look-up table (LUT) 33 to map the new physical address to LBAx, and updates the page management table to invalidate the old physical address (old data).

After that, the controller 4 returns, to the host 2, a response indicating the completion of the command (step S56).

As described above, the response indicating the completion of the command may be transmitted to the host 2 when the write data has been written to the write buffer 31.

In contrast, if the abort command has been received, the controller 4 aborts the write command (step S57).

Figure 18:
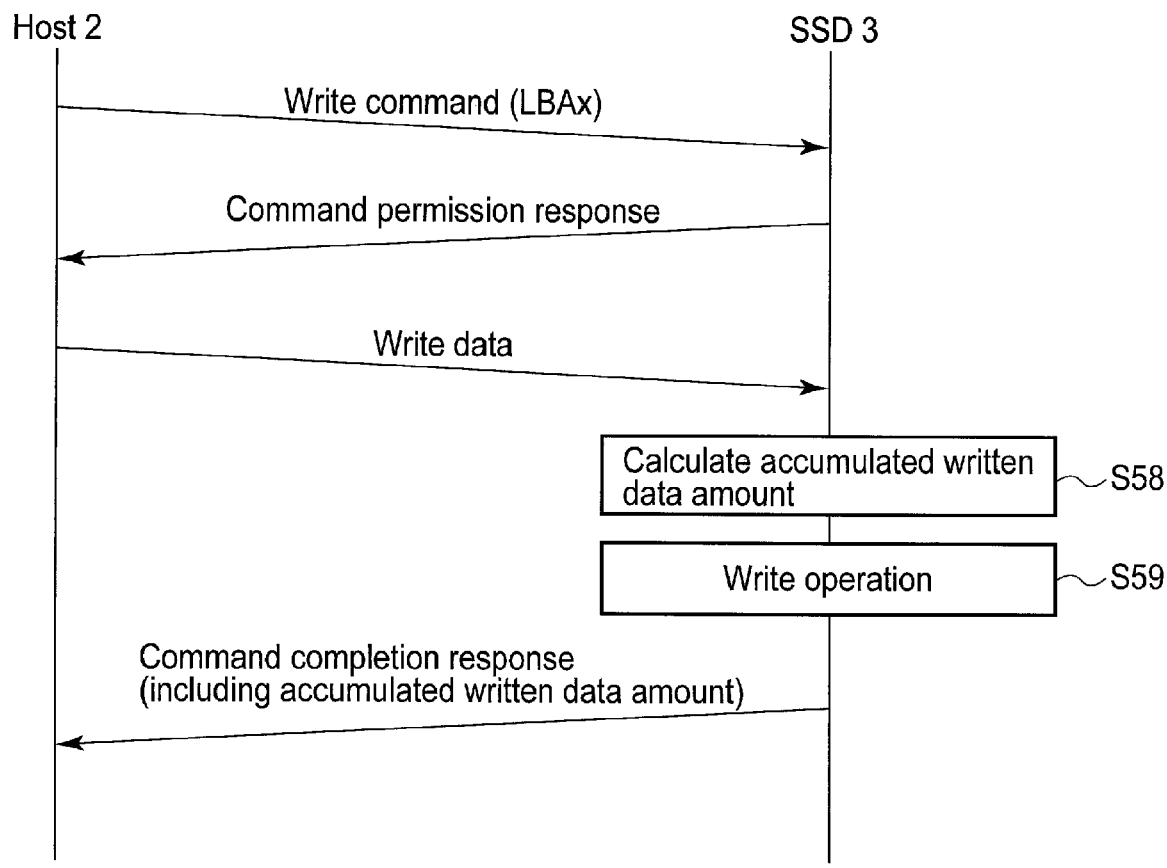
FIG. 18 is an illustration of another sequence of the accumulated-written-data-amount response processing performed by the memory system of the embodiment.

FIG. 18 shows another sequence of the accumulated-written-data-amount response processing.

The host 2 sends, to the SSD 3, a write command including a certain LBA (=LBAx) as a starting LBA. In response to this write command, the controller 4 of the SSD 3 transmits a command permission response to the host 2. In response to the command permission response, the host 2 sends write data to the SSD 3. The write data is written to the write buffer 31. The controller 4 of the SSD 3 calculates an accumulated written data amount (step S58). The processing of calculating the accumulated written data amount may be started upon receiving the write command.

Thereafter, the controller 4 writes the write data to the write target block (step S59), and transmits, to the host 2, a response indicating the command completion and including the calculated accumulated data amount.

In addition, as described above, the command completion response including the calculated accumulated data amount may be transmitted to the host 2 when the write data has been written to the write buffer 31.

The flowchart of FIG. 19 shows yet another procedure of the accumulated-written-data-amount response processing.

The controller 4 receives a write command including LBAx as a starting LBA from the host 2 (step S61). The controller 4 returns a permission response to the host 2 (step S62). The controller 4 receives write data from the host 2 (step S63). The write data is written to the write buffer 31.

The controller 4 calculates an accumulated written data amount obtained during the time from the last write to LBAx to the current write to LBAx, based on an old physical address mapped to LBAx, a new physical address to be mapped to LBAx, an allocated number allocated to a block including a physical storage position designated by the old physical address, an allocated number allocated to a block (current write target block) including a physical storage position designated by the new physical address, etc (step S64). The controller 4 proceeds to step S65.

In step S65, the controller 4 writes the write data in the write buffer 31 to the current write target block, updates the look-up table (LUT) 33 to map the new physical address to LBAx, and updates the page management table to invalidate the old physical address (old data).

After that, the controller 4 returns, to the host 2, a command completion response including the accumulated written data amount (step S66).

As described above, the command completion response may be transmitted to the host 2 when the write data has been written to the write buffer 31.

Referring then to FIGS. 20 to 23, a description will be given of processing of notifying the host 2 of time data associated with the time that has elapsed from the last write to the same LBA, instead of the accumulated written data amount.

The time data is associated with the time that has elapsed from the last write to the same LBA, and may indicate the time when the last write to the same LBA was made, or may indicate the time interval between the last and current writes to the same LBA.

Figure 20:
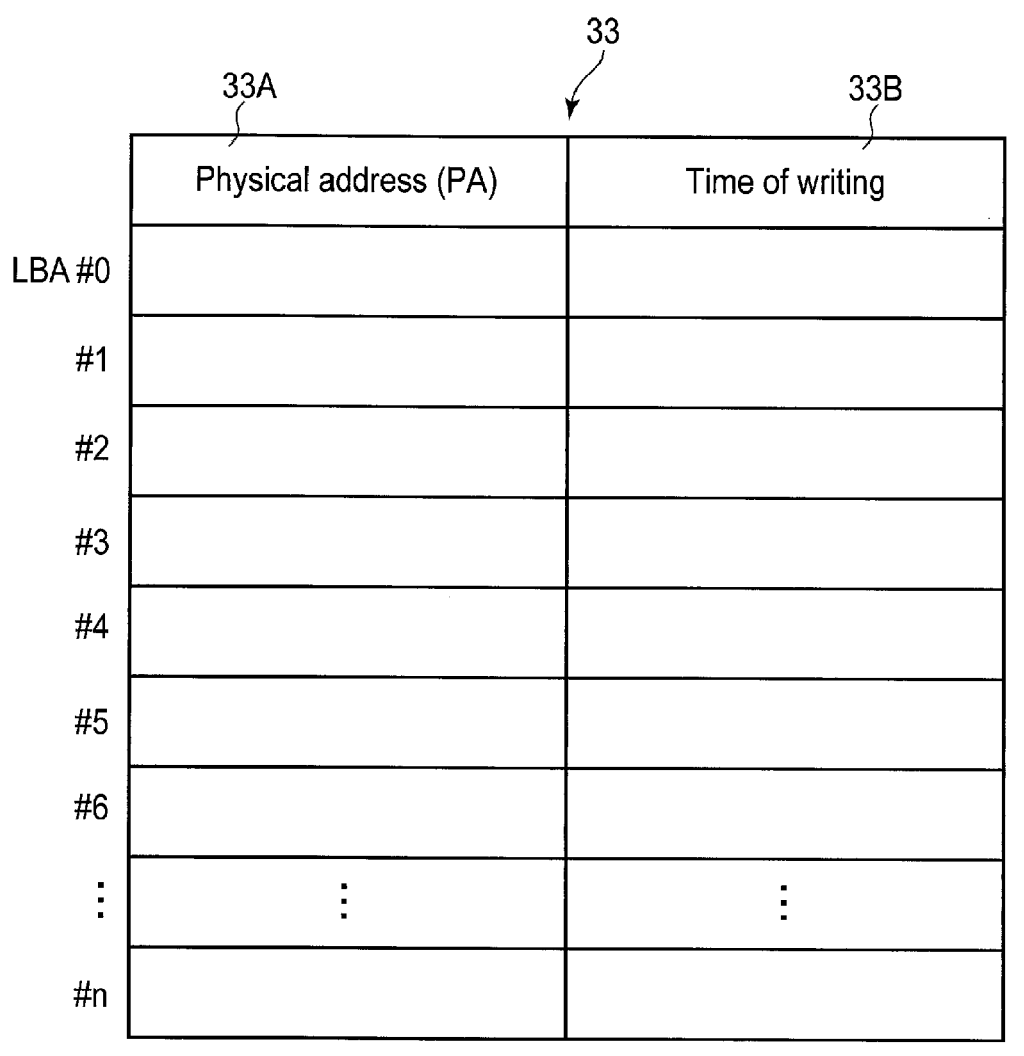

FIG. 20 shows an example of the look-up table (LUT) 33 configured to manage, in units of, for example, 4 Kbytes (=a predetermined management unit), the correspondence relationship between the LBA, the physical address, and the time when the last write was made.

The look-up table (LUT) 33 includes physical address storage areas 33A and time storage areas 33B for respective LBAs. Each time storage area 33B is used to hold a value indicating the time when a write was made to a corresponding LBA, namely, a value indicating the time when the data of the corresponding LBA was written. The time held in each time storage area 33B may be an hour/minute/second, for example.

Upon receiving a write command including a certain LBA, the controller 4 registers a corresponding physical address in a physical address storage area 33A corresponding to the LBA, and registers, in a time storage area 33B corresponding to the LBA, the time when data (write data) designated by the write command has been written. The physical address is the physical address of a physical storage position to which the data designated by the write command has been written. The time when a write has been made may be the time when the write command has been received, may be the time when the data designated by the write command has been written to the write buffer 31, or may be the time when the data designated by the write command has been written to a write target block in the NAND memory 5.

Figure 21:
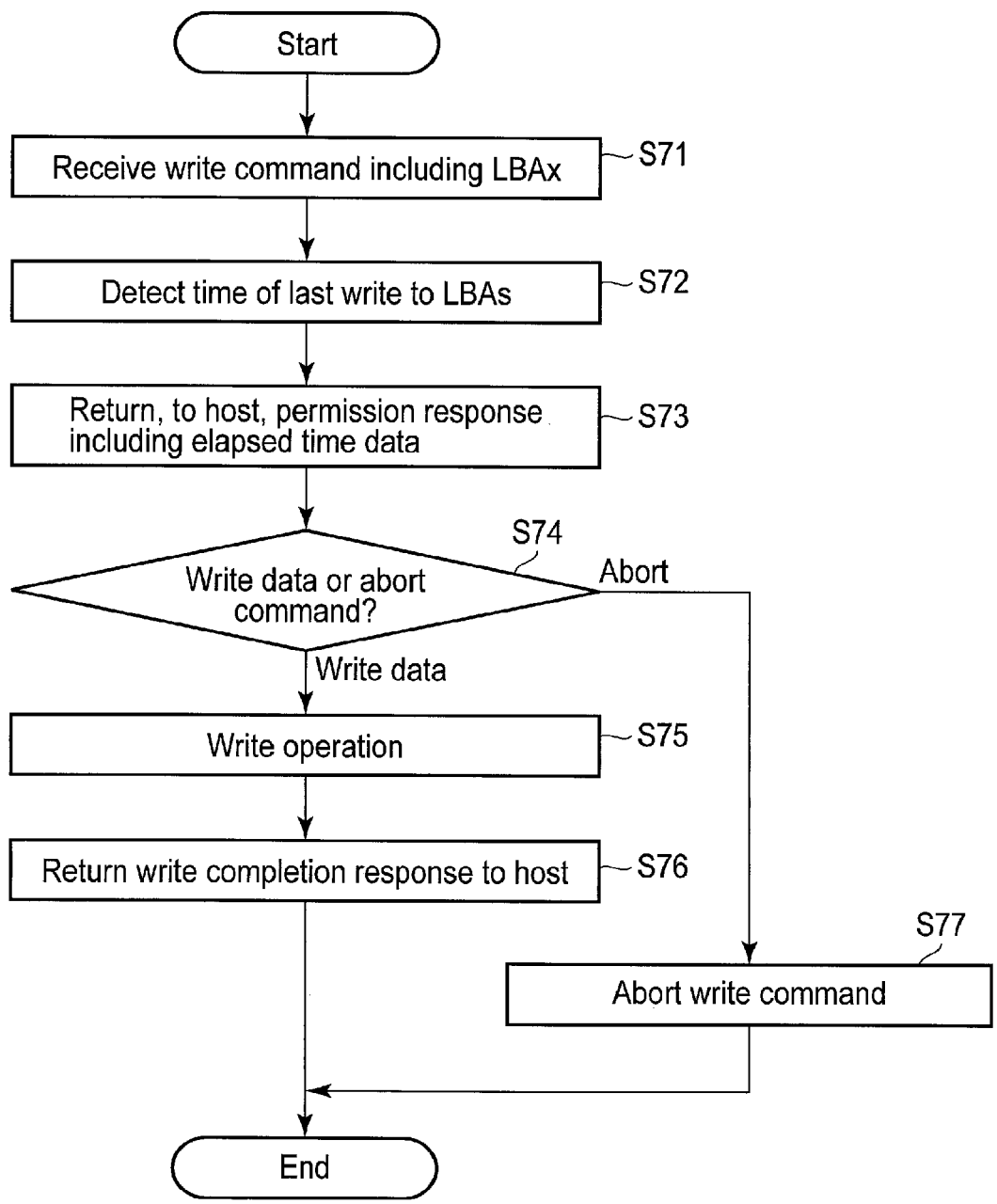
FIG. 21 is a flowchart of a procedure of time-data response processing performed by the memory system of the embodiment when a write to the same LBA is requested.

The flowchart of FIG. 21 shows the procedure of time-data response processing performed by the controller 4.

Assume here a case where a command permission response including time data is transmitted to the host 2.

The controller 4 receives a write command including LBAx as a starting LBA from the host 2 (step S71). The controller 4 refers to the look-up table (LUT) 33, thereby acquiring the time when the last write to LBAx was made, namely, the time when data was written in response to the last write command including LBAx (step S72). The controller 4 returns a command permission response including the time data to the host 2 (step S73). As described above, the time data may be a time interval between the last and current writes to LBAx, namely, a time obtained by subtracting the time of the last write to LBAx from the current time (the time of the current write to LBAx).

The controller 4 determines whether write data corresponding to the write command or an abort command for aborting this write data has been received from the host 2 (step S74).

If the write data has been received, the controller 4 proceeds to step S75. In step S75, the controller 4 writes the write data to the write buffer 31, writes the write data in the write buffer 31 to the current write target block, updates the look-up table (LUT) 33 to map a new physical address and a new write time to LBAx, and updates the page management table to invalidate an old physical address (old data).

Thereafter, the controller 4 returns a command completion response to the host 2 (step S76).

As described above, the command completion response may be transmitted to the host 2 when the write data has been written to the write buffer 31.

In contrast, if the abort command has been received, the controller 4 aborts the write command (step S77).

Although the flowchart of FIG. 21 is directed to the case of transmitting the command permission response including time data is transmitted to the host 2, a command completion response including time data may be transmitted to the host 2. The transmission of the command completion response including time data can be realized by the same procedure as that shown in FIGS. 18 and 19.

Figure 22:
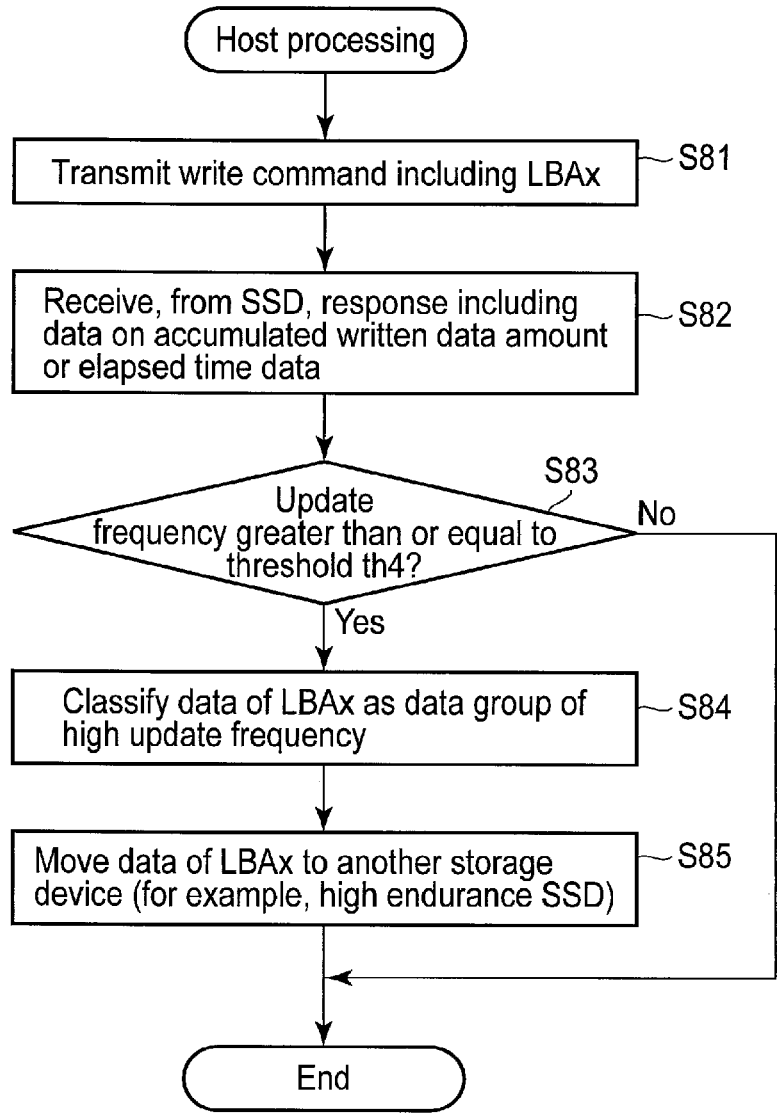
FIG. 22 is a flowchart of a procedure of processing performed by the host based on accumulated-written-data-amount/time data received from the memory system of the embodiment.

The flowchart of FIG. 22 shows the procedure of processing performed by the host 2 based on the accumulated written data amount/time data notified by the SSD 3.

The host 2 may classify data into two or more types of data groups having different update frequencies, based on the accumulated written data amount/time data notified by the SSD 3. For instance, the file system 43 of the host 2 may include a data manager configured to classify data into two or more types of data groups, thereby separating a data group (hot data group) wherein data is frequently updated, from a data group (cold data group) wherein data is not frequently updated. If the frequency of update of data written to the SSD 3 is greater than or equal to a certain threshold, the data manager can recognize that this data is hot data.

The data manager may move data, detected to be hot data, from the SSD 3 to another storage device, in order to cause the update frequencies of respective LBA ranges in the same SSD to fall within as the same frequency range as possible.

On the other hand, if the SSD 3 is realized as an expensive SSD having high endurance, hot data may be left in the SSD 3, and cold data may be moved from the SSD 3 to another storage device. An example of the expensive SSD having high endurance includes an SLC-SSD that holds one-bit data per memory cell.

One of the indices that indicate the endurance of an SSD is a drive write per day (DWPD). For example, regarding an SSD having a total capacity of 1 terabytes (1 TB), DWPD=10 means that a data write of 10 terabytes (10 TB) (=10×1 TB) can be performed per day over five years.

A procedure example of the above processing will now be described.

The host 2 transmits a write command including LBAx to the SSD 3 (step S81), and receives from the SSD 3 a response (a command permission response or a command completion response) including (1) data indicative of the accumulated written data amount or (2) time data (step S82).

Based on the accumulated written data amount or time data, the host 2 determines whether the update frequency of the data of LBAx (the frequency of writes to LBAx) is greater than or equal to a predetermined upper limit (threshold th4) (step S83). For example, in the case where the accumulated written data amount is notified by the SSD 3, the host 2 may determine whether the accumulated written data amount is greater than or equal to a threshold data amount corresponding to threshold th4. In the case where time data (indicating the time of the last write to the same LBA) is notified by the SSD 3, the host 2 may calculate a time interval by subtracting the time of the last write from the current time, and may determine whether this interval is greater than or equal to a threshold interval corresponding to threshold th4. Alternatively, the host 2 may convert the accumulated written data amount or the time data into a percentage that indicates the ratio of write access to LBAx to all write accesses to all LBAs, thereby determining whether the percentage is greater than or equal to a threshold percentage represent by threshold th4.

If the update frequency (the frequency of writes to LBAx) of the data of LBAx is greater than or equal to threshold th4 (YES in step S83), the host 2 classifies the data of LBAx as a high-update-frequency data group (hot data) (step S84), and moves the data of LBAx from the SSD 3 to another storage device (step S85).

In step S84, if the response including the accumulated written data amount or the time data is a permission response to the write command, the host 2 may perform processing of aborting the write command.

FIG. 23 shows a hardware configuration example of the information processing apparatus serving as the host 2.

The information processing apparatus is realized as a server computer or a personal computer. The information processing apparatus comprises a processor (CPU) 101, a main memory 102, a BIOS-ROM 103, a network controller 105, a peripheral interface controller 106, a controller 107, an embedded controller (EC) 108, etc.

The processor 101 is a CPU configured to control the operation of each component of the information processing apparatus. This processor 101 executes various programs loaded from any one of the SSDs 3 to the main memory 102. The main memory 102 comprises a random access memory such as a DRAM. The programs executed by the processor 101 include the above-described application software layer 41, the operating system 42 and the file system 43.

The processor 101 also executes the basic input/output system (BIOS) stored in the BIOS-ROM 103 as a nonvolatile memory. The BIOS is a system program for hardware control.

The network controller 105 is a communication device, such as a wired LAN controller or a wireless LAN controller. The peripheral interface controller 106 is configured to communicate with a peripheral device, such as a USB device.

The controller 107 is connected to a plurality of connectors 107A, and is configured to communicate with devices connected to the connectors 107A. In the embodiment, a plurality of SSDs 3 are connected to the respective connectors 107A. The controller 107 is an SAS expander, a PCIe Switch, a PCIe expander, a flash array controller, or a RAID controller.

The EC 108 functions as a system controller configured to perform power management of the information processing apparatus. The EC 108 turns on and off the information processing apparatus in response to a user's operation of a power switch. The EC 108 is realized as processing circuitry such as a one-chip microcontroller. The EC 108 may contain a keyboard controller for controlling an input device such as a keyboard (KB).

The processing described referring to FIG. 22 is performed by the processor 101 under control of the file system 43.

Figure 24:
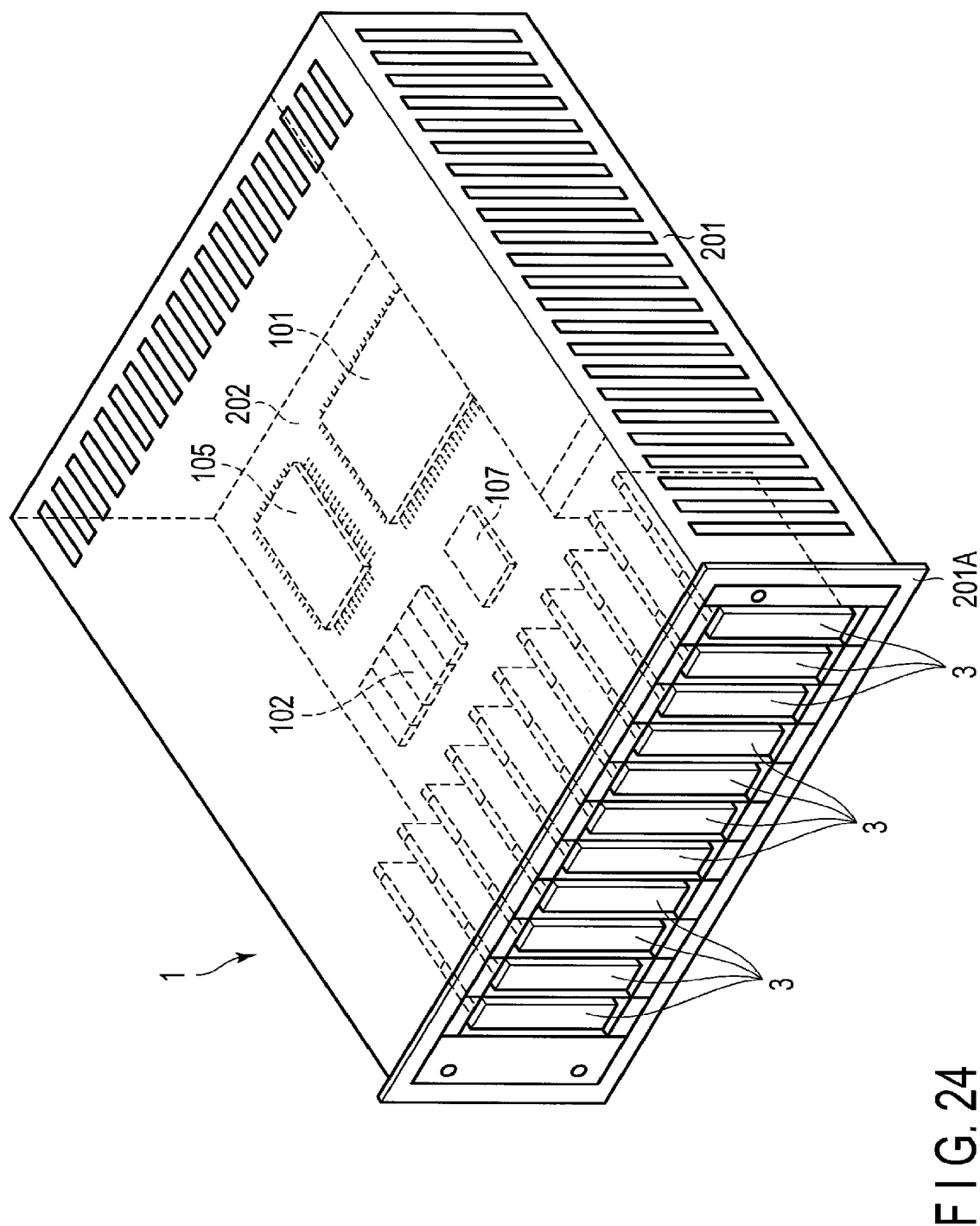
FIG. 24 is a perspective view illustrating a computer that includes the memory system of the embodiment and the host.

FIG. 24 shows a configuration example of the information processing apparatus including a plurality of SSDs 3 and the host 2.

The information processing apparatus comprises a thin box-shaped casing 201 that can be accommodated in a rack. The SSDs 3 may be arranged in the casing 201. In this case, the SSDs 3 may be detachably inserted in respective slots formed in the front surface 201A of the casing 201.

A system board (mother board) 202 is placed in the casing 201. On the system board (mother board) 202, various electronic components, which include the CPU 101, the memory 102, the network controller 105 and the controller 107, are mounted. These electronic components cooperate to function as the host 2.

As described above, in the function of notifying an LBA-base update frequency, according to the embodiment, upon receiving a write command including an LBA from the host 2, (1) a total amount of data written to the NAND memory 5 by the host 2 during a time ranging from a last write to the LBA of the received write command to a current write to the LBA of the received write command, or (2) time data associated with a time elapsing from the last write to the LBA of the received write command to the current write to the LBA of the received write command, is obtained. Further, the total data amount or the time data is notified to the host 2 as a response to the received write command. Thus, the host 2 is notified of the update frequency of data in units of LBA included in each write command.

In addition, the embodiment employs a NAND memory as an example of the nonvolatile memory. However, the function of the embodiment is also applicable to other various nonvolatile memories, such as a magnetoresistive random access memory (MRAM), a phase-change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller including a host interface and a processor configured to control the host interface, and configured to:
receive, through the host interface from the host, a first write command including a first logical address;
in response to receiving the first write command, write first data associated with the first write command into the nonvolatile memory;
receive, through the host interface from the host, a second write command including a second logical address; and
in response to receiving the second write command, write second data associated with the second write command into the nonvolatile memory, wherein
the controller is configured to:
when the second logical address included in the second write command is identical with the first logical address included in the first write command,
obtain a total amount of data received from the host during a period from a time of receiving the first write command to a time of receiving the second write command, or a value representing an elapsed time from a time of processing with respect to the first write command to a time of processing with respect to the second write command;
update a logical-to-physical address translation table such that a new physical address in which the second data are written is mapped to the first logical address; and
notify the host of the total amount of data or the value representing the elapsed time.

2. The memory system according to claim 1, wherein the controller is configured to:
obtain the total amount of data, on the basis of a first physical storage position in the nonvolatile memory, in which the first data were written by the first write command, a second physical storage position in the nonvolatile memory, in which the second data are to be written by the second write command, and the number of blocks allocated for writing data from the host during a period from allocation of a first block including the first physical storage position to allocation of a second block including the second physical storage position; and
notify the host of the obtained total amount of data.

3. The memory system according to claim 1, wherein the controller is configured to notify the host of the total amount of data or the value representing the elapsed time as a permission response or as a command completion response to the received first write command.

4. The memory system according to claim 1, wherein the time of processing with respect to the second write command and the time of processing with respect to the first write command are indicative of a time when the second write command is received and a time when the first write command is received, respectively.

5. The memory system according to claim 1, wherein the time of processing with respect to the second write command and the time of processing with respect to the first write command are indicative of a time when the second data associated with the second write command are written into a write buffer included in the memory system and a time when the first data associated with the first write command are written into the write buffer, respectively.

6. The memory system according to claim 1, wherein the time of processing with respect to the second write command and the time of processing with respect to the first write command are indicative of a time when the second data associated with the second write command are written into the nonvolatile memory and a time when the first data associated with the first write command are written into the nonvolatile memory, respectively.

7. A memory system connectable to a host, comprising:
a nonvolatile memory; and
a controller including a host interface and a processor configured to control the host interface, and configured to:
receive, through the host interface from the host, a first write command including a first logical address;
in response to receiving the first write command, write first data associated with the first write command into the nonvolatile memory;
receive, through the host interface from the host, a second write command including a second logical address; and
in response to receiving the second write command, write second data associated with the second write command into the nonvolatile memory, wherein
the controller is configured to:
when the second logical address included in the second write command is identical with the first logical address included in the first write command,
obtain a total amount of data received from the host during a period from a time of receiving the first write command to a time of receiving the second write command;
update a logical-to-physical address translation table such that a new physical address in which the second data are written is mapped to the first logical address; and
notify the host of the obtained total amount of data.

8. The memory system according to claim 7, wherein the controller is configured to:
obtain the total amount of data, on the basis of a first physical storage position in the nonvolatile memory, in which the first data were written by the first write command, a second physical storage position in the nonvolatile memory, in which the second data are to be written by the second write command, and the number of blocks allocated for writing data from the host during a period from allocation of a first block including the first physical storage position to allocation of a second block including the second physical storage position; and
notify the host of the obtained total amount of data.

9. The memory system according to claim 7, wherein the controller is configured to notify the host of the total amount of data as a permission response or as a command completion response to the received first write command.

10. A method of controlling a memory system connectable to a host, the memory system including a nonvolatile memory and a controller including a host interface and a processor configured to control the host interface, the method comprising:
receiving, through the host interface from the host, a first write command including a first logical address;
in response to receiving the first write command, writing first data associated with the first write command into the nonvolatile memory;
receiving, through the host interface from the host, a second write command including a second logical address; and
in response to receiving the second write command, writing second data associated with the second write command into the nonvolatile memory, wherein
the method further comprises:
when the second logical address included in the second write command is identical with the first logical address included in the first write command,
obtaining a total amount of data received from the host during a period from a time of receiving the first write command to a time of receiving the second write command, or a value representing an elapsed time from a time of processing with respect to the first write command to a time of processing with respect to the second write command;
updating a logical-to-physical address translation table such that a new physical address in which the second data are written is mapped to the first logical address; and
notifying the host of the total amount of data or the value representing the elapsed time.

11. The method according to claim 10, wherein
the obtaining includes obtaining the total amount of data, on the basis of a first physical storage position in the nonvolatile memory, in which the first data were written by the first write command, a second physical storage position in the nonvolatile memory, in which the second data are to be written by the second write command, and the number of blocks allocated for writing data from the host during a period from allocation of a first block including the first physical storage position to allocation of a second block including the second physical storage position; and
the notifying includes notifying the host of the obtained total amount of data.

12. The method according to claim 10, wherein
the notifying includes notifying the host of the total amount of data or the value representing the elapsed time as a permission response or as a command completion response to the received first write command.

13. The method according to claim 10, wherein
the time of processing with respect to the second write command and the time of processing with respect to the first write command are indicative of a time when the second write command is received and a time when the first write command is received, respectively.

14. The method according to claim 10, wherein
the time of processing with respect to the second write command and the time of processing with respect to the first write command are indicative of a time when the second data associated with the second write command are written into a write buffer included in the memory system and a time when the first data associated with the first write command are written into the write buffer, respectively.

15. The method according to claim 10, wherein
the time of processing with respect to the second write command and the time of processing with respect to the first write command are indicative of a time when the second data associated with the second write command are written into the nonvolatile memory and a time when the first data associated with the first write command are written into the nonvolatile memory, respectively.

16. A memory system connectable to a host, comprising:
a nonvolatile memory; and
a controller including a host interface and a processor configured to control the host interface, and configured to:
receive, through the host interface from the host, a first write command including a first logical address;
in response to receiving the first write command, write first data associated with the first write command into the nonvolatile memory;

receive, through the host interface from the host, a second write command including a second logical address; and in response to receiving the second write command, write second data associated with the second write command into the nonvolatile memory, wherein the controller is configured to:

when the second logical address included in the second write command is identical with the first logical address included in the first write command, obtain a value representing an elapsed time from a time of processing with respect to the first write command to a time of processing with respect to the second write command;

update a logical-to-physical address translation table such that a new physical address in which the second data are written is manned to the first logical address; and notify the host of the value representing the elapsed time.

17. The memory system according to claim 16, wherein the controller is configured to notify the host of the value representing the elapsed time as a permission response or as a command completion response to the received first write command.

18. The memory system according to claim 16, wherein the time of processing with respect to the second write command and the time of processing with respect to the first write command are indicative of a time when the second write command is received and a time when the first write command is received, respectively.

19. The memory system according to claim 16, wherein the time of processing with respect to the second write command and the time of processing with respect to the first write command are indicative of a time when data associated with the second write command are written into a write buffer included in the memory system and a time when data associated with the first write command are written into the write buffer, respectively.

20. The memory system according to claim 16, wherein the time of processing with respect to the second write command and the time of processing with respect to the first write command are indicative of a time when data associated with the second write command are written into the nonvolatile memory and a time when data associated with the first write command are written into the nonvolatile memory, respectively.

\* \* \* \* \*